United States Patent
Cheng et al.

(10) Patent No.: US 12,442,766 B2
(45) Date of Patent: Oct. 14, 2025

(54) BOND-SELECTIVE INTENSITY DIFFRACTION TOMOGRAPHY AND USES THEREOF

(71) Applicant: Trustees of Boston University, Boston, MA (US)

(72) Inventors: Ji-Xin Cheng, Newton, MA (US); Jian Zhao, Boston, MA (US); Lei Tian, Newton, MA (US); Alex Matlock, Brighton, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 18/582,748

(22) Filed: Feb. 21, 2024

(65) Prior Publication Data

US 2024/0272074 A1    Aug. 15, 2024

Related U.S. Application Data

(63) Continuation of application No. 18/100,347, filed on Jan. 23, 2023, now Pat. No. 11,913,881.

(60) Provisional application No. 63/389,582, filed on Jul. 15, 2022.

(51) Int. Cl.
*G01N 21/63* (2006.01)
*G01N 21/65* (2006.01)

(52) U.S. Cl.
CPC ..... *G01N 21/636* (2013.01); *G01N 2021/637* (2013.01); *G01N 2021/655* (2013.01)

(58) Field of Classification Search
CPC .. G01N 21/636; G01N 21/068; G01N 21/171; G01N 2021/637; G01N 2021/655; G01N 2021/1712
See application file for complete search history.

(56) References Cited

U.S. PATENT DOCUMENTS

| | | | |
|---|---|---|---|
| 4,655,608 A | 4/1987 | Goss et al. | |
| 2010/0246610 A1 | 9/2010 | Mirov et al. | |
| 2013/0134310 A1* | 5/2013 | Furstenberg | G01J 3/443 250/353 |
| 2018/0088041 A1 | 3/2018 | Zhang et al. | |
| 2018/0246032 A1 | 8/2018 | Li et al. | |

(Continued)

FOREIGN PATENT DOCUMENTS

WO    2021116766 A1    6/2021

OTHER PUBLICATIONS

Cho et al "Apparatus for Inspecting Homogeneity of the Coefficient of the Optically Induced Linear Birefringence in Thin Film", May 22, 2009, WO2009064039 A1 (Year: 2009).*

(Continued)

*Primary Examiner* — Sang H Nguyen

(74) *Attorney, Agent, or Firm* — Cesari and McKenna, LLP; Steven M. Mills

(57) ABSTRACT

An example microscope includes a pump laser for providing a first illumination to a sample. A laser array provides a second illumination to the sample. The laser array may include a plurality of laser elements, each providing oblique illuminations to the sample. An illumination collecting source collects the first illumination and the second illumination from the sample. The illumination collecting source may capture transient 3D refractive index (RI) variations in the sample due to the first illumination and second illumination.

22 Claims, 18 Drawing Sheets

(56) References Cited

U.S. PATENT DOCUMENTS

| | | | |
|---|---|---|---|
| 2019/0120753 A1* | 4/2019 | Prater | G01N 21/59 |
| 2019/0226835 A1* | 7/2019 | Rudd | G01B 11/2513 |
| 2019/0310307 A1* | 10/2019 | Ginsberg | G02B 21/08 |
| 2020/0113439 A1* | 4/2020 | Mohseni | A61B 5/0042 |
| 2020/0134773 A1* | 4/2020 | Pinter | G01N 21/8806 |
| 2020/0274314 A1* | 8/2020 | Bezel | H01J 65/04 |
| 2020/0348182 A1 | 11/2020 | Cheng et al. | |
| 2021/0011166 A1* | 1/2021 | Hannebauer | G01S 7/484 |
| 2021/0072153 A1 | 3/2021 | Zalevsky et al. | |
| 2021/0164894 A1* | 6/2021 | Prater | G01N 21/171 |
| 2021/0302763 A1 | 9/2021 | Yao et al. | |
| 2022/0074861 A1 | 3/2022 | Cheng et al. | |

OTHER PUBLICATIONS

Apicco et al., "Reducing the RNA binding protein TIA1 protects against tau-mediated neurodegeneration in vivo," Nature Neuroscience, vol. 21, pp. 72-80, 2018.

Ayoub et al., "3D reconstruction of weakly scattering objects from 2D intensity-only measurements using the Wolf transform," Optics Express, vol. 29, No. 3, pp. 3976-3984, 2021.

Ayoub et al., "Optical Diffraction Tomography Using Nearly In-Line Holography with a Broadband LED Source," Applied Sciences, vol. 12, No. 951, pp. 1-14, 2022.

BAEK et al., "Intensity-based holographic imaging viaspace-domain Kramers-Kronig relations," Nature Photonics, vol. 15, pp. 354-360, 2021.

Bai et al., "Bond-selective imaging by optically sensing themid-infrared photothermal effect," Science Advances, vol. 7, pp. 1-14, 2021.

Bai et al., "Ultrafast chemical imaging by widefield photothermal sensing of infrared absorption," Science Advances, vol. 5, pp. 1-8, 2019.

Baker et al., "Using Fourier transform IR spectroscopy to analyze biological materials," Nature Protocols, vol. 9, No. 8, pp. 1771-1791, 2014.

Barbastathis et al., "On the use of deep learning for computational imaging," Optica, vol. 6, No. 8, pp. 921-943, 2019.

Chen et al., "Multi-layer Born multiple-scattering model for 3D phase microscopy," Optica, vol. 7, No. 5, pp. 394-403, 2020.

Chen et al., "Spatial light interference microscopy: principle and applications to biomedicine," Advances in Optics and Photonics, vol. 13, No. 2, pp. 353-425, 2021.

Cheng et al., "Vibrational spectroscopic imaging of living systems: An emerging platform for biology and medicine," Bioimaging, vol. 350, No. 6264, pp. 1-11, 2015.

Dejgaard et al., "New Method for Quantitation of Lipid Droplet vol. From Light Microscopic Images With an Application to Determination of PAT Protein Density on the Droplet Surface," Journal of Histochemistry & Cytochemistry, vol. 66, No. 6, pp. 447-465, 2018.

Fu et al., "Characterization of photodamage in coherent anti-Stokes Raman scattering microscopy," Optics Express, vol. 14, No. 9, pp. 3942-3951, 2006.

Hu et al., "Harmonic optical tomography of nonlinear structures," Nature Photonics, vol. 14, pp. 564-569, 2020.

Hugonnet et al., "Multiscale label-free volumetric holographic histopathology of thick-tissue slides with subcellular resolution," Advanced Photonics, vol. 3, No. 2, pp. 1-8, 2021.

Kim et al., "Mitotic Chromosomes in Live Cells Characterized Using High-Speed and Label-Free Optical Diffraction Tomography," Cells, vol. 8, No. 1368, pp. 1-16, 2019.

Ledwig et al., "Quantitative 3D refractive index tomography of opaque samples in epi-mode," Optica, vol. 8, No. 1, pp. 6-14, 2021.

Lee et al., "Cholesterol Esterification Inhibition Suppresses Prostate Cancer Metastasis by Impairing the Wnt/B-catenin Pathway," Molecular Cancer Research, vol. 16, No. 6, pp. 974-985, 2018.

Lee et al., "Isotropically resolved label-free tomographicimaging based on tomographic moulds for opticaltrapping," Light: Science & Applications, vol. 10, No. 102, pp. 1-9, 2021.

Lee et al., "Multimodal Metabolic Imaging Reveals Pigment Reduction and Lipid Accumulation in Metastatic Melanoma," BME Frontiers, vol. 2021, pp. 1-17, 2021.

Lee et al., "Raman microspectroscopy for microbiology,"Nature Reviews Methods Primers, vol. 1, No. 80, pp. 1-25, 2021.

Lee et al., "Reprogrammed lipid metabolism in bladder cancer with cisplatin resistance," Oncotarget, vol. 9, No. 17, pp. 13231-13243, 2018.

Lemieux et al., "Insights and challenges in using C. elegans for investigation of fat metabolism," Critical Reviews in Biochemistry and Molecular Biology, vol. 50, No. 1, pp. 69-84, 2015.

Li et al., "High-speed in vitro intensity diffraction tomography," Advanced Photonics, vol. 16, pp. 1-13, 2019.

Li et al., "Super-Resolution Far-Field Infrared Imaging by Photothermal Heterodyne Imaging," The Journal of Physical Chemistry B, vol. 121, pp. 8838-8846, 2017.

Ling et al., "High-throughput intensity diffraction tomography with a computational microscope," Biomedical Optics Express, vol. 9, No. 5, pp. 2130-2141, 2018.

Liu et al., "Quantum Local Monomer IR Spectrum of Liquid D2O at 300 K from 0 to 4000 cm-1 Is in NearQuantitative Agreement with Experiment," The Journal of Physical Chemistry B, vol. 120, pp. 2824-2828, 2016.

Matlock et al., "High-throughput, volumetric quantitative phase imaging with multiplexed intensity diffraction tomography," Biomedical Optics Express, vol. 10, No. 12, pp. 6432-6448, 2019.

Mckay et al., "C. elegans: A Model for Exploring the Genetics of Fat Storage," Developmental Cell, vol. 4, pp. 131-142, 2003.

Menendez et al., "Fatty acid synthase and the lipogenic phenotype in cancer pathogenesis," Nature Reviews Cancer, vol. 7, pp. 763-777, 2007.

Micó et al., "Resolution enhancement in quantitative phase microscopy," Advances in Optics and Photonics, vol. 11, No. 1, pp. 135-214, 2019.

Park et al., "Quantitative phase imaging in biomedicine," Nature Photonics, vol. 12, pp. 578-589, 2018.

Pavlovetc et al., "Infrared photothermal heterodyne imaging: Contrast mechanism and detection limits," Journal of Applied Physics, vol. 127, pp. 1-7, 2020.

Pleitez et al., "Label-free metabolic imaging by mid-infrared optoacoustic microscopy in living cells," Nature Biotechnology, vol. 38, pp. 293-296, 2020.

Popescu et al., "Optical imaging of cell mass and growth dynamics," Am. J. Physiol. Cell Physiol., vol. 295, pp. C538-C544, 2008.

Rinnan et al., "Review of the most common pre-processing techniques for near-infrared spectra," Trends in Analytical Chemistry, vol. 28, No. 10, pp. 1201-1222, 2009.

Salazar, "On thermal diffusivity," European Journal of Physics, vol. 24, pp. 351-358, 2003.

Samolis et al., "Phase-sensitive lock-in detection for highcontrast mid-infrared photothermal imaging with sub-diffraction limited resolution," Optics Express, vol. 27, No. 3, pp. 2643-2655, 2019.

Shen et al., "Raman Imaging of Small Biomolecules," Annual Review of Biophysics, vol. 48, pp. 347-369, 2019.

Shi et al., "Mid-infrared metabolic imaging with vibrational probes," Nature Methods, vol. 17, pp. 844-851, 2020.

Su et al., "Steam disinfection releases micro(nano)plastics from silicone-rubber baby teats as examined by optical photothermal infrared microspectroscopy," Nature Nanotechnology, vol. 17, pp. 76-85, 2022.

Sung et al., "Three-Dimensional Holographic Refractive-Index Measurement of Continuously Flowing Cells in a Microfluidic Channel," Physical Review Applied, pp. 1-8, 2014.

Tamamitsu et al., "Label-free biochemical quantitative phase imaging with mid-infrared photothermal effect," Optica, vol. 7, No. 4, pp. 359-366, 2020.

Tian et al., "3D intensity and phase imaging from light field measurements in an LED array microscope," Optica, vol. 2, No. 2, pp. 104-111, 2015.

Tian et al., "Quantitative differential phase contrast imaging in an LED array microscope," Optics Express, vol. 23, pp. 1-10, 2015.

(56) References Cited

OTHER PUBLICATIONS

Toda et al., "Adaptive dynamic range shift (ADRIFT) quantitative phase imaging," Light: Science & Applications, vol. 10, No. 1, pp. 1-10, 2021.
Wang et al., "Imaging Lipid Metabolism in Live Caenorhabditis elegans Using Fingerprint Vibrations," Angewandte Chemie, vol. 126, pp. 11981-11986, 2014.
Wang et al., "Tau in physiology and pathology," Nature Reviews Neuroscience, vol. 17, pp. 5-21, 2016.
Weitzman et al., "Growing without a size checkpoint," Journal of Biology, vol. 2, pp. 1-4, 2003.
Wolf et al., "Three-Dimensional Structure Determination of Semi-Transparent Objects from Holographic Data," Optics Communications, vol. 1, No. 4, pp. 153-156, 1969.
Yin et al., "Nanosecond-resolution photothermal dynamic imaging via MHZ digitization and match filtering," Nature Communications, vol. 12, No. 7097, pp. 1-11, 2021.
Zhang et al., "Bond-selective transient phase imaging via sensing of the infrared photothermal effect," Light: Science & Applications, vol. 8, No. 116, pp. 1-12, 2019.
"Zhang et al., "Depth-resolved mid-infrared photothermalimaging of living cells and organisms with submicrometer spatial resolution," Sci. Adv., pp. 1-7, 2016."
Zong et al., "Background-Suppressed High-Throughput Mid-Infrared Photothermal Microscopy via Pupil Engineering," ACS Photonics, vol. 8, pp. 3323-3336, 2021.

\* cited by examiner

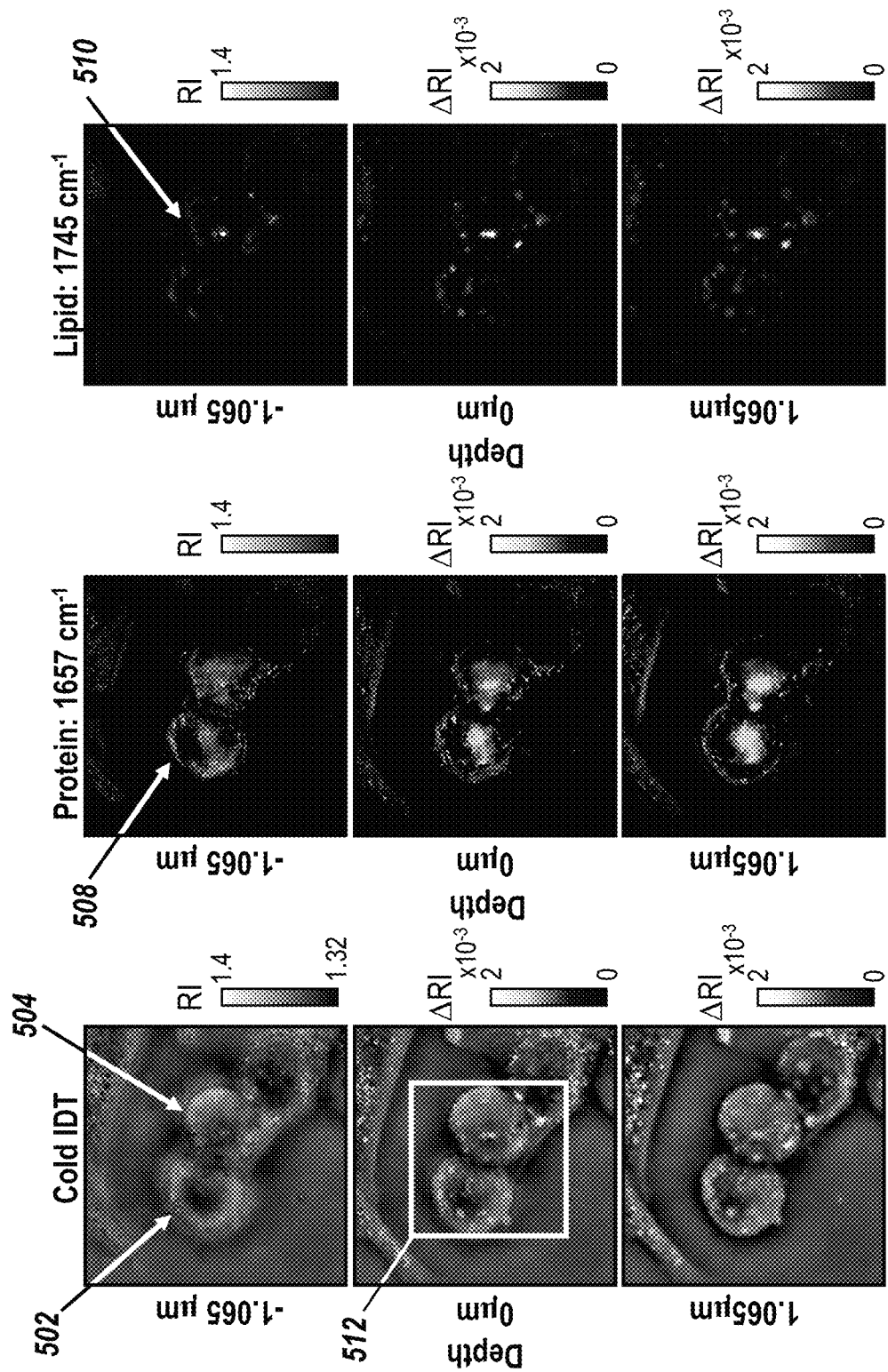

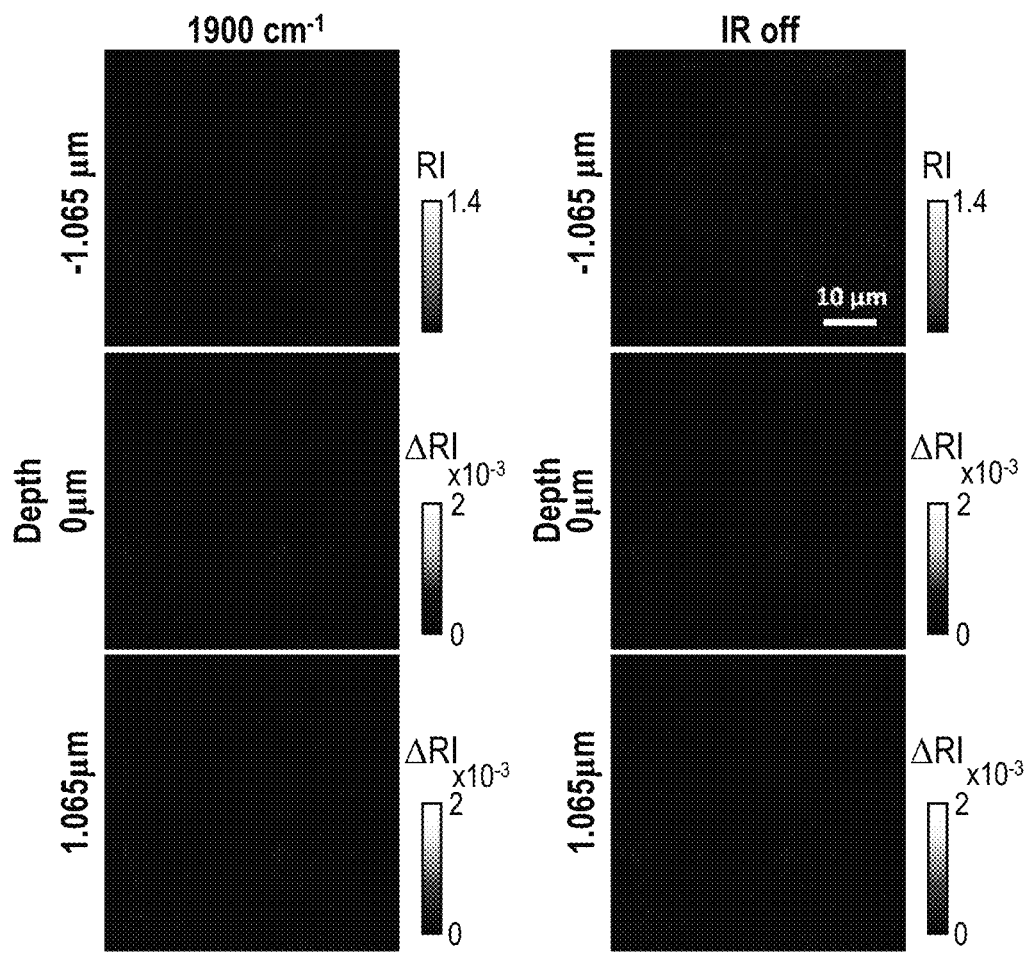
*Fig. 5D*  *Fig. 5E*

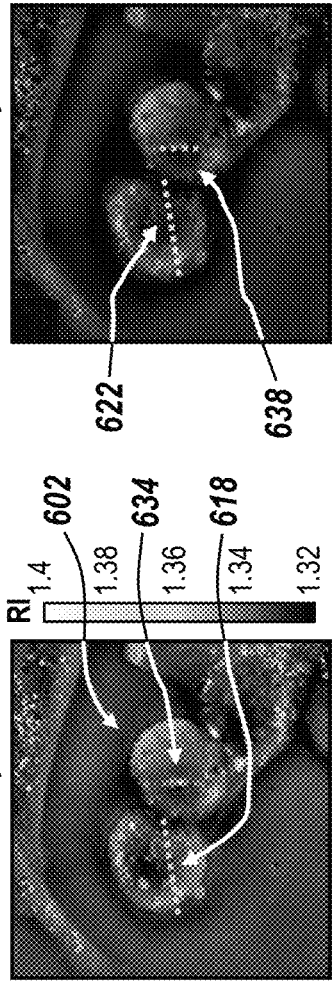
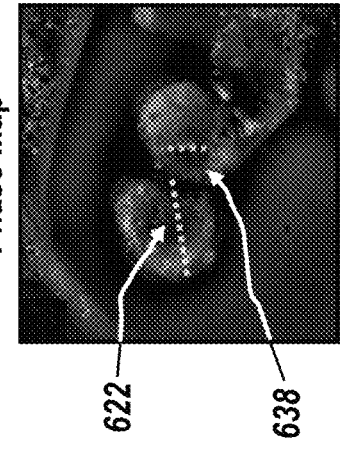
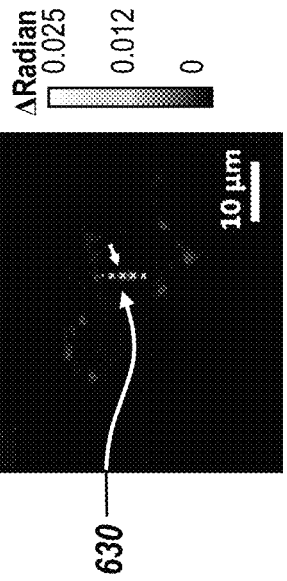
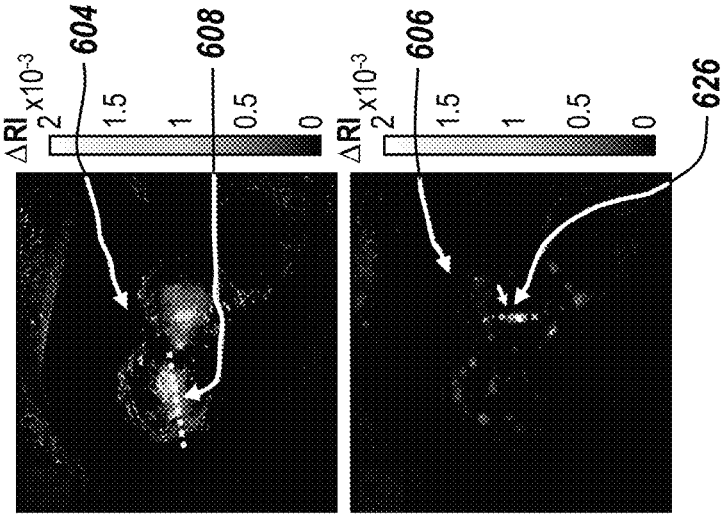

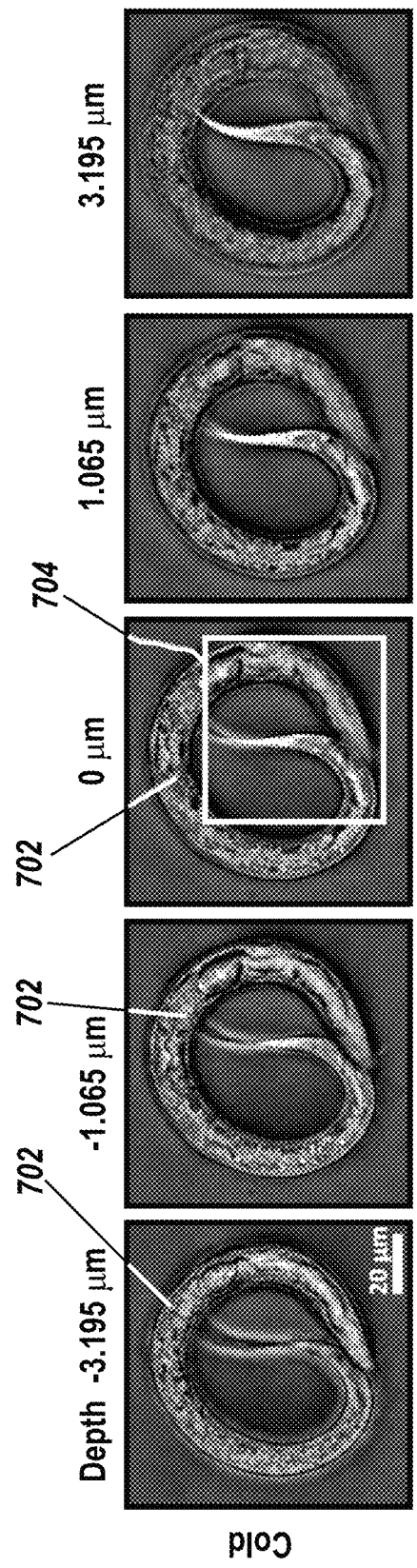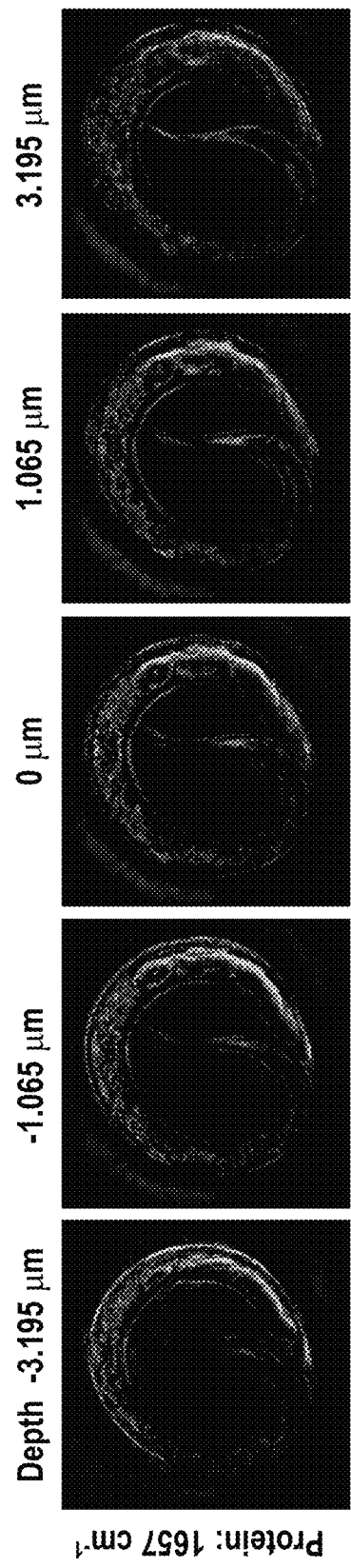

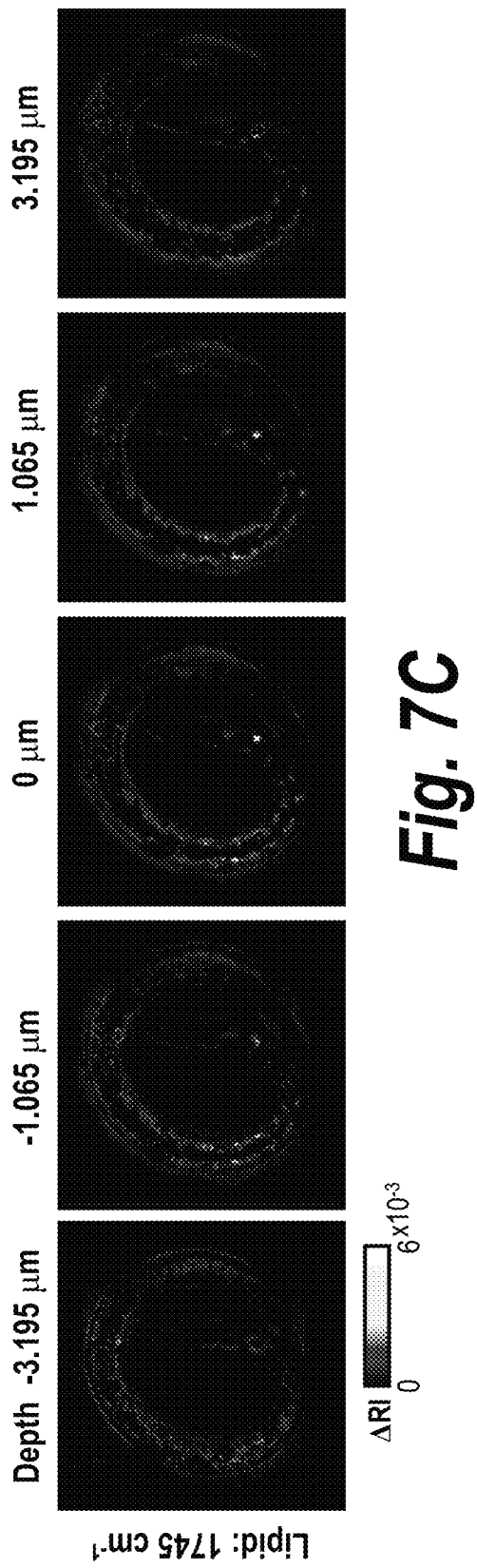
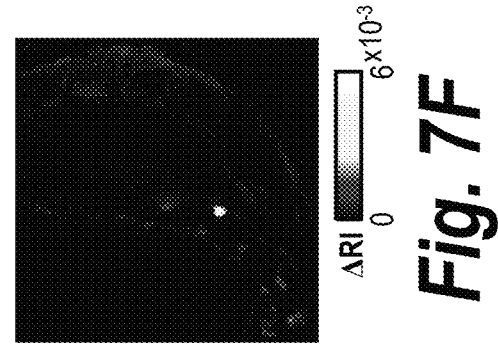
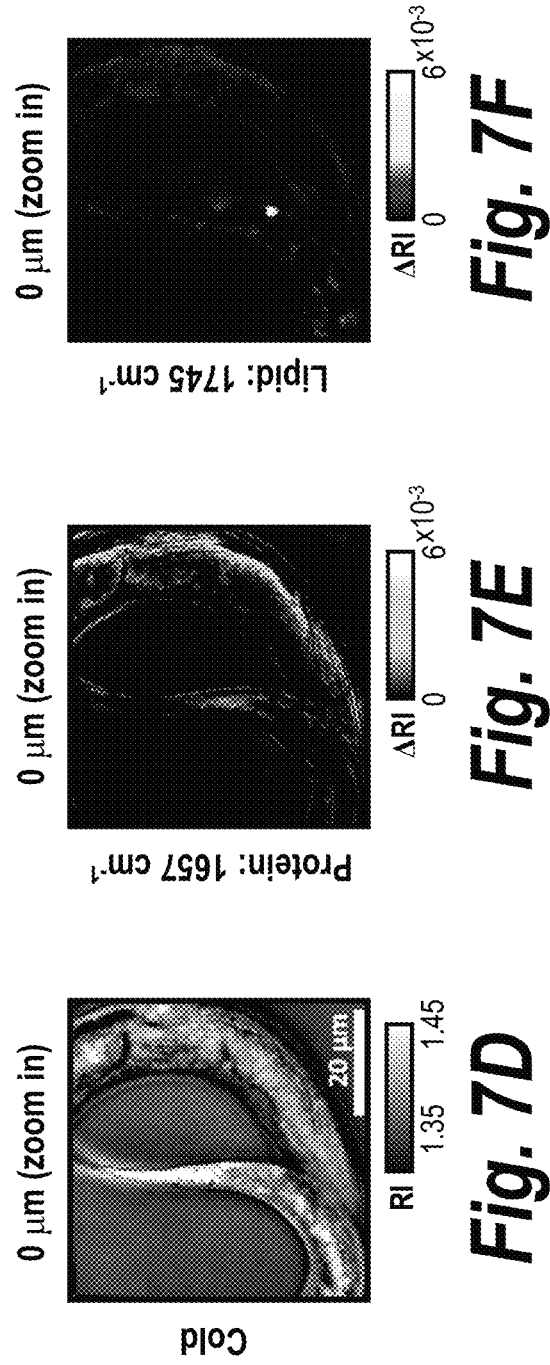

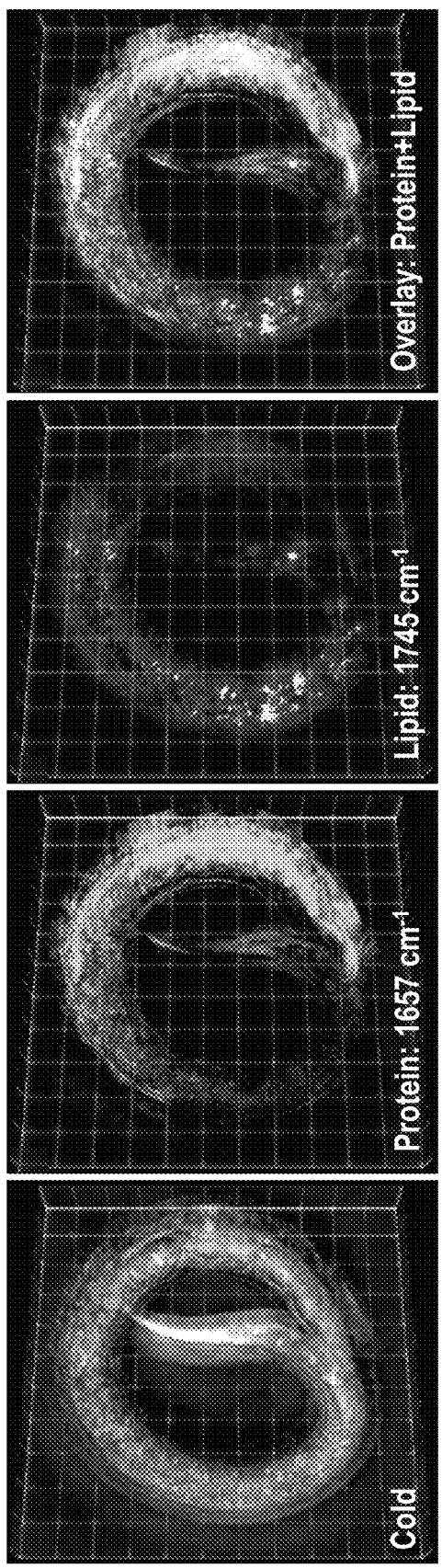

BOND-SELECTIVE INTENSITY DIFFRACTION TOMOGRAPHY AND USES THEREOF

RELATED APPLICATIONS

This application is a continuation of U.S. application Ser. No. 18/100,347, filed on Jan. 23, 2023, which claims priority to U.S. Provisional Application No. 63/389,582, filed on Jul. 15, 2022, the contents of each of which are included herein in their entirety.

BACKGROUND

Optical microscopy plays a pivotal role in modern biological research and clinical practice. Its capabilities of visualizing and quantifying subcellular structures provide deep insights into cell physiology. Among various solutions, quantitative label-free microscopy has gained popularity from being able to investigate the biological objects in their native state, thereby circumventing fluorescence microscopy's weaknesses including phototoxicity, photobleaching, and cellular functions perturbations. Several label-free microscopy methods based on elastic scattering, such as holographic imaging and computational imaging methods, have been implemented to recover subcellular morphology. These methods provide high-speed quantifications of the objects' optical phase delay or Refractive Index (RI) distributions with nanometer resolution and nanoscale sensitivity and have gained significant progress in applications such as living neuron activity evaluations, cell mass quantifications, mitotic chromosomes characterizations, and volumetric tissue histopathology. These solutions, however, are fundamentally limited by their lack of molecular specificity, preventing the differentiation of biochemical compositions or subcellular structures with similar morphologies.

To realize chemical-specific label-free microscopy, vibrational spectroscopic imaging techniques have been developed to chemically image cellular morphology based on signals from intrinsic chemical bond vibrations. Among numerous technical realizations, coherent Raman scattering microscopy has been developed for high-speed vibrational imaging and applied to address various biomedical problems. Despite its success, Raman scattering is a weak scattering process with an extremely small scattering cross-section ($\sim 10^{-30}$–$10^{-28}$ cm$^2$). In most cases, coherent Raman scattering imaging requires tightly-focused laser beams with large excitation power, resulting in a high potential for photodamage[24].

In comparison, infrared (IR) absorption offers a cross-section ($\sim 10^{-18}$ cm$^2$) that is ten orders of magnitude larger than Raman scattering. Furthermore, IR imaging can be implemented without a tight beam focus, featuring higher chemical sensitivity and reduced photodamage risk. The emerging mid-infrared photothermal (MIP) microscopy inherits IR absorption spectroscopy's advantages but circumvents conventional IR micro-spectroscopy's low-resolution and slow speed limit. MIP microscopy provides diffraction-limited resolution at the visible band using a visible probe beam and is compatible with both point-scanning and wide-field configurations. Yet, existing MIP microscopy suffers from slow volumetric imaging speed and low depth resolution.

More recently, the MIP effect has been harnessed to bring molecular specificity to holographic microscopy and realize MIP-based high-performance quantitative volumetric chemical imaging. In this direction, several interferometry-based holographic chemical imaging methods have been proposed. The first MIP holographic microscope was created enabling 2D quantitative chemical imaging on unlabeled living cells. However, this method only partially recovers the complex biological process, and valuable depth-resolved information is still missing.

Recently, it has been reported a MIP 3D holographic microscopy was formed using Optical Diffraction Tomography (ODT) for depth-resolved chemical cellular imaging. This approach unravels the phase information from interferometrically modulated scattered light fields. However, the modality requires a complicated optical illumination beamline, a two-arm interferometer, and specialized optics for implementation. These features tend to increase phase noise, optical misalignment, and mechanical instabilities, which limit the detection sensitivity and the system compatibility with commercial microscopes. Using this approach, a significant amount of averaging is needed to achieve an adequate signal-to-noise ratio (SNR) and limits the acquisition to ~12.5 minutes per volume. The demonstrated depth resolution for this approach is limited to approximately 3 μm with a Field of View (FOV) comparable to a single cell. These limitations hinder the full exploration of volumetric chemical imaging and negate the high-speed advantages of widefield illumination configurations.

SUMMARY

An example microscope includes a pump laser for providing a first illumination to a sample. A laser array provides a plurality of second illuminations to the sample. The laser array includes a plurality of laser elements, each providing oblique illuminations to the sample. An illumination collection source collects transmitted illuminations from the sample. The illumination collection source captures transient 3D refractive index (RI) variations in the sample due to illuminations provided by the laser array.

The pump laser may include a mid-IR pump laser. The first illumination may include a mid-IR fingerprint region between ~5 μm and ~20 μm. Each of the laser elements may be a Continuous Wave (CW) diode laser. Each of the laser elements may include a central wavelength between 400 nm and 700 nm Each of the laser elements may be modulated at a tunable repetition rate between 0 kHz and 10 kHz. Each of the laser elements may include a pulse duration between 0.6 μs and 1 μs. The pump laser may illuminate the sample under an on-axis configuration. Each of the laser elements may be operated at a same repetition rate and pulse duration as the pump laser. The illumination collection source may be a CMOS camera or CCD camera.

An example method for forming a microscope includes providing, using a pump laser, a first illumination to a sample. The method includes providing, using a laser array, a plurality of second illuminations to the sample. The laser array includes a plurality of laser elements, each providing oblique illuminations to the sample. The method includes collecting, using an illumination collection source, transmitted illuminations from the sample. Furthermore, the method includes capturing, using the illumination collection source, transient 3D refractive index (RI) variations in the sample due to the illuminations provided by the laser array.

The pump laser may include a mid-IR pump laser. The first illumination may include a mid-IR fingerprint region between 5 μm and 20 μm. Each of the light sources may be a Continuous Wave (CW) diode laser. Each of the laser elements may include a central wavelength between 400 nm and 700 nm. Each of the laser elements may be modulated at a tunable repetition rate between 0 kHz and 10 kHz. Each of the laser elements may include a pulse duration between 0.6 µs and 1 µs. The pump laser may illuminate the sample under an on-axis configuration. Each of the laser elements may be operated at a same repetition rate and pulse duration as the pump laser. The illumination collection source may be a CMOS camera or CCD camera.

An example method for performing chemical imaging includes synchronizing a probe laser, a pump laser, and a camera at an acquisition speed. The method includes applying illuminations from the synchronized probe laser and pump laser to a sample. For each probe laser illumination, a pair of raw images are collected from the sample. Also, the method includes reconstructing a pair of 3D refractive index (RI) volume maps using an inverse scattering model and 16 pairs of raw images. Furthermore, the method includes performing a subtraction operation on the reconstruction pair of 3D RI volume maps to reveal 3D RI fluctuations of the sample.

The probe lasers may be a part of a linear array laser. The pump laser may be a mid-IR pump laser. Mid-infrared photothermal (MIP) effects may be triggered in the sample. One of the pair of raw images may be generated when the sample is exposed to both illuminations from the pump laser and from one of the probe lasers. Another of the pair of raw images may be generated when the sample is exposed to illuminations from one of the probe lasers and not from the pump laser.

Additional features and advantages of the present disclosure is described in, and will be apparent from, the detailed description of this disclosure.

BRIEF DESCRIPTION OF THE DRAWINGS

The disclosure is illustrated by way of example, and not by way of limitation, in the figures of the accompanying drawings in which like reference numerals are used to refer to similar elements. It is emphasized that various features may not be drawn to scale and the dimensions of various features may be arbitrarily increased or reduced for clarity of discussion.

FIGS. 5A-5M illustrate the 3D chemical imaging and mid-IR fingerprint spectroscopy capabilities of a BS-IDT imaging system on fixed human bladder cancer cell samples.

FIGS. 6A-6J illustrate the BS-IDT imaging results and the BS-DPC imaging results obtained using the same raw bladder cancer cell dataset.

FIGS. 7A-7K illustrate multicellular organism 3D chemical imaging and mid-IR fingerprint spectroscopy with an example BS-IDT imaging system on a *C. elegans* worm 602.

DETAILED DESCRIPTION

Figure 1:
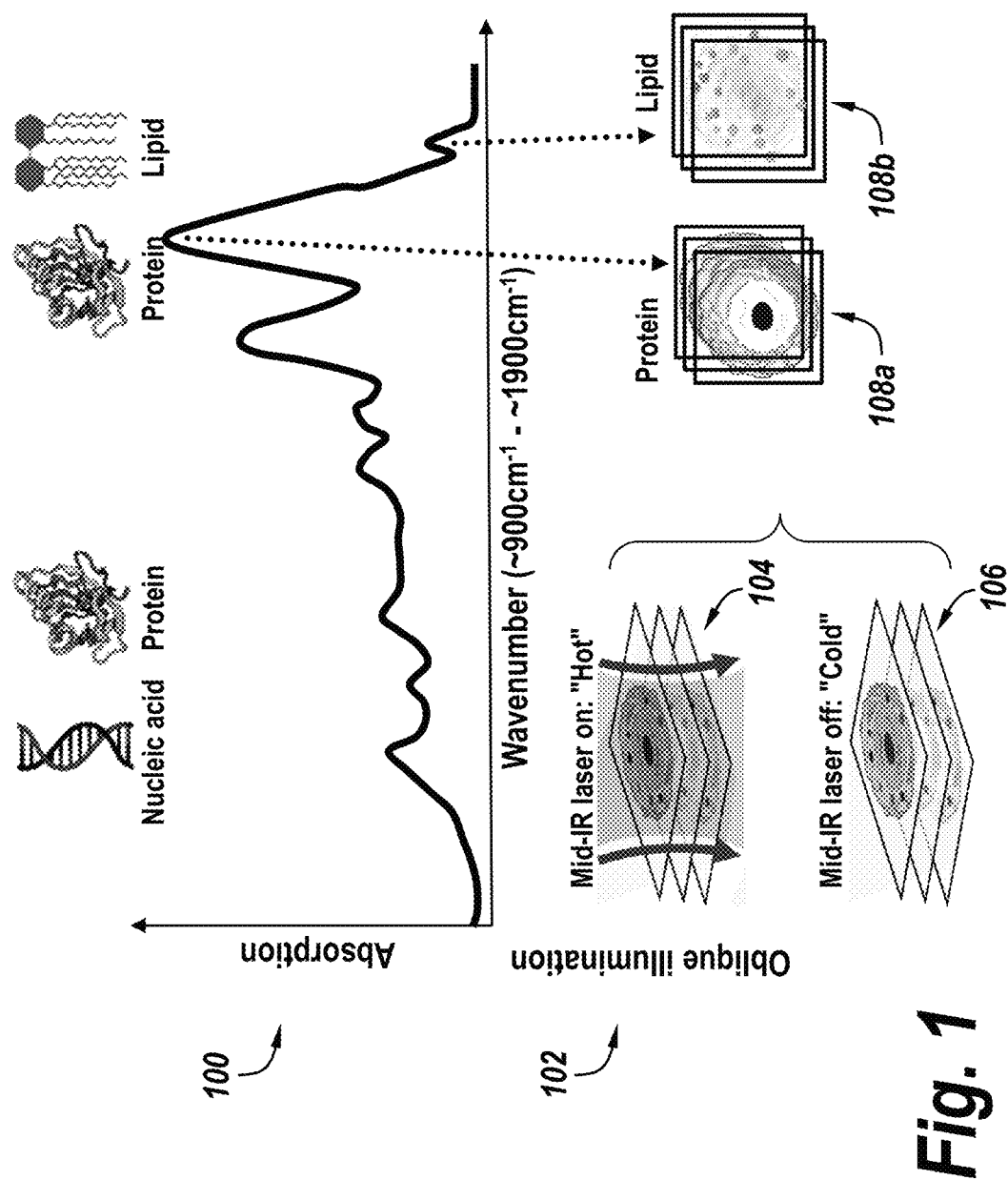
FIG. 1 illustrates the general principles of MIP effects used by a BS-IDT imaging system.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may recognize that other elements and/or operations may be desirable and/or necessary to implement the devices, systems, and methods described herein. But because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

The terminology used herein is for the purpose of describing particular example embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer, or section. That is, terms such as "first," "second," and other numerical terms, when used herein, do not imply a sequence or order unless clearly indicated by the context.

This disclosure describes a non-interferometric computational MIP microscopy system and method for 3D bond-selective label-free imaging. This scheme enables both high-resolution, high-speed volumetric quantitative chemical imaging and HI fidelity mid-infrared fingerprint spectroscopy within a standalone imaging modality. A time-gated pump-probe MIP microscopy are synergistically integrated with the pulsed-laser-based Intensity Diffraction Tomography (IDT), termed Bond-Selective Intensity Diffraction Tomography (BS-IDT). The time-gated pump-probe detection captures the transient 3D RI variations at a microsecond timescale. The 3D RI is quantitatively measured by the pulsed IDT using a scan-free, non-interferometric setup.

Notably, the system is built as an add-on to a commercial brightfield microscope to significantly reduce system complexity. The scan-free and common-path design minimizes mechanical instabilities and phase noise. These unique features allow for high-speed (~0.05 Hz, up to ~6 Hz) and high-resolution (~350 nm laterally, ~1.1 µm axially) 3D hyperspectral imaging with a large FOV (~100 µm×100 µm).

Compared to the state-of-the-art ODT-based MIP microscopy, the BS-IDT may improve the quantitative chemical volumetric imaging speed by ~40 times, depth resolution by ~3 times, and FOV by ~3 times. High-fidelity recovery of mid-IR fingerprint spectroscopic information may be enabled by the BS-IDT. Moreover, the BS-IDT may provide high-speed chemical imaging capabilities on single-cell samples and recover mid-IR fingerprint spectra focusing on protein and lipid bands. This may be by quantitatively extracting 3D chemical information from cell organelles. In addition, the system can also achieve 2D bond-selective differential phase contrast (BS-DPC) computational microscopy and highlight the benefits of the 3D imaging capability of BS-IDT through a quantitative comparison of the two methods on the same cell samples.

BS-IDT integrates the IDT modality with a pump-probe MIP wide-field detection scheme to provide chemical information with high temporal and spatial resolution. The mid-IR pump laser triggers MIP effects in the sample, while the IDT component provides an easily implementable imaging system probing the MIP-induced chemical-specific 3D RI variation. To account for the temporal constraints of MIP microscopy's pump-probe detection, a pulsed IDT system is provided with a customized nanosecond (ns) pulsed laser ring array to capture these RI variations. The principle, instrumentation, and image reconstruction of BS-IDT are detailed further below.

FIG. 1 shows the general principles of MIP effects used by a BS-IDT imaging system. The BS-IDT imaging system utilizes MIP effects from the mid-IR fingerprint region (~5 μm to ~20 μm) and a pump-probe detection technique to generate a chemical-specific RI map. Insert 100 shows each absorption peak area in the mid-IR fingerprint region corresponds to a unique molecular vibrational bond that, if harnessed, can differentiate distinct biochemical compounds in the sample. In this case, the biochemical compounds may include proteins and lipids. When a mid-IR laser pump beam illuminates a sample, the radiation absorbed by the molecular vibrational bond causes a transient and localized temperature increase. This MIP-induced sample expansion modifies the sample's local RI distribution, leading to the sample's scattering cross-section variations. The generated heat can dissipate within a few microseconds to tens of microseconds.

Insert 102 shows the pump mid-IR pulse oscillated between "On" and "Off" at high speed, creating periodic mid-IR light absorption in the sample. This oscillation creates "Hot" 104 and "Cold" states 106, respectively, where the chemical-specific RI variations are present or absent in the sample. The sufficiently fast and sensitive pulsed IDT imaging system with multiple off-resonant probe beams can capture this information within a microsecond time scale to recover the chemical-specific RI variations of the object quantitatively by a subtraction between "Hot" state 104 and "Cold" state 106 resulting in a volumetric chemical morphology. In this case, the volumetric chemical morphology may include proteins 108a and lipids 108b as well as other structures. Capturing this transient RI fluctuation requires a unique pump-probe pulsed IDT imaging system.

Figure 2:
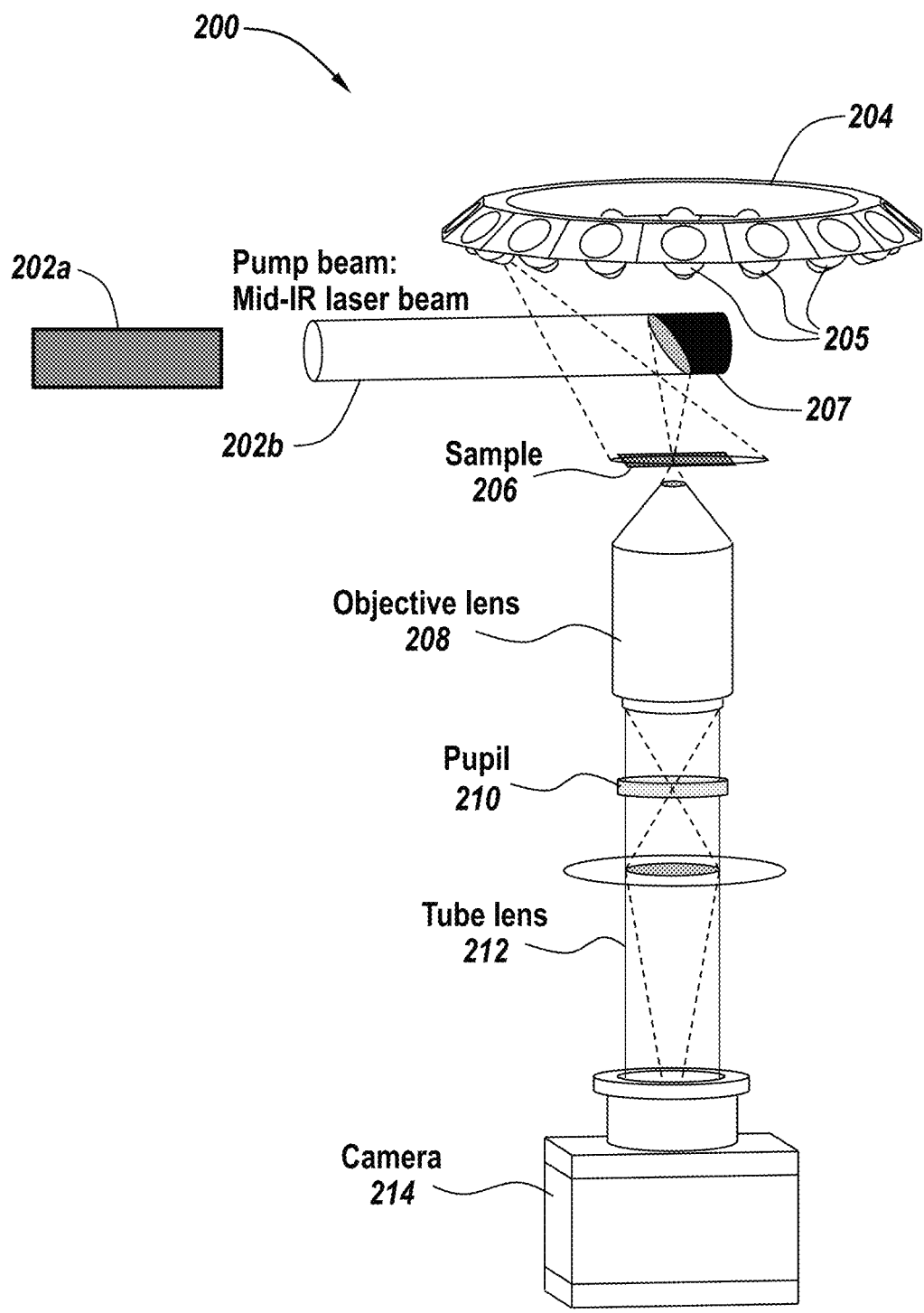
FIG. 2 is a schematic of an example BS-IDT imaging system.

FIG. 2 is a schematic of an example BS-IDT imaging system 200. The BS-IDT imaging system 200 may include a brightfield transmission microscope a reflective lens for focusing the mid-IR pump beam 202b from mid-IR source 202a. A laser ring array 204 having a number of low-cost Continuous Wave (CW) diode lasers 205 with a 450 nm central wavelength that obliquely illuminate sample 206 for the IDT probe illumination. The central wavelength of the lasers 205 may between 400 nm and 700 nm. A pulsed laser array 204, instead of the LED array in conventional IDT, may be required to synchronize with the high speed of the pulsed mid-IR beam 202 for detecting the MIP-induced RI variations. Each CW diode laser 205 may be electrically modulated at a tunable repetition rate (0 to 10 kHz) and pulse duration (~0.6 μs to ~1 μs).

During data acquisitions, each diode laser 205 may be operated at the same repetition rate and pulse duration as the mid-IR laser for both the "Hot" and "Cold" states. The oblique illumination angle of each laser diode 205 may be set to match the microscope's objective numerical aperture (NA), which maximizes the spatial frequency coverage allowed by the system. This spatial frequency enhancement follows synthetic aperture principles and expands the accessible bandwidth to achieve the diffraction-limited resolution of incoherent imaging systems. To reduce spatial coherence and suppress speckle noise, one may install diffusers at the output of each optical-fiber-coupled laser diode 205.

For providing the mid-IR sample illumination, an off-axis gold parabolic mirror 207 may be positioned above sample stage 206 to integrate the MIP pump-probe detection into BS-IDT imaging system 200. The pulsed mid-IR laser beam 202 illuminates the sample under an on-axis configuration. The parabolic mirror 207 focuses the mid-IR beam spot to a size of ≈63 μm at full width at half maximum (FWHM) to enhance the mid-IR laser intensity at the area of interest. This mid-IR beam size decides the chemical imaging FOV for a single wide-field measurement and is sufficiently large for encompassing single cells. For larger objects, such as C. elegans, one may extend this FOV by scanning the mid-IR beam 202 and stitching the chemical imaging information computationally. BS-IDT imaging system 200 simplifies the system realization to the extent that a regular low-cost brightfield microscope can be upgraded to BS-IDT merely by replacing the illumination sources.

In one example, the pulsed laser array 204 may include 16 individual diode lasers (wavelength: ~450 nm, average power under CW mode: ~3 W, repetition rate: up to 10 kHz, pulse duration: ~0.6 μs to ~10 μs). In other implementations, pulse laser array 204 may have or more less than 16 diode lasers.

The probe beam may be coupled and transmitted through multimode optical fibers (0.22 NA, 105 μm core diameter). The probe beam illumination area on the sample may have a diameter of around 4 cm. plane. One may customize a ring fiber head holder that guarantees the illumination angle matches the microscope objective's NA. Each optical fiber head may be designed as an instant plug-in for the ring holder. The ring holder can either be made with metallic materials in a machine shop or 3D printed with plastic materials. This holder can be modified to incorporate additional diode lasers or to provide different illumination angles matching the NA of other microscope objectives. One may customize a set of circuit boards and a microcontroller to control the diode lasers. Each diode laser is easy to plug in/pull out from the circuit boards. The mid-IR pump laser may be a Daylight solution MIRcat-2400 QCL laser or the like.

Objective lens 208, pupil 210, and tube lens 212 are used to guide the transmitted light from sample 206 to camera 214. BST-IDT uses the transmitted light to perform the chemical morphological analysis.

To reconstruct the 3D RI biological sample map, BS-IDT implements a physical model relating the objects' properties to the scattering information recorded by the intensity images. Specifically, BS-IDT imaging system 200 may utilize the first-Born approximation that models the scattering generated by the sample as a linear problem considering only the single scattering events between the incident field and the object. This approximation implies that the scattered field from each point throughout the object space is independent and allows the object to be considered as an axially discretized set of decoupled 2D slices. The axially discretized set of decoupled 2D slices may enable slice-wise 3D recovery of the object's RI using an easily implementable, efficient, and closed-form deconvolution inverse method.

In this case, camera 214 may capture a 2D intensity image encoding the object's 3D volume for each oblique illumination. The cross-interference extracted from intensity images can be mapped into the 3D frequency domain. By synthesizing all the spectra data obtained from different illuminations from diodes 205, the 3D object can be recovered by transforming the synthesized Ewald's sphere back to the spatial domain. The recovered 3D RI map lays the foundation for MIP-based bond-selective volumetric imaging. In one example, camera 214 may be a CMOS camera or the like. In another example, camera 214 may be a CCD camera or the like The energy fluence of the probe beam on the sample area may be ~0.2 pJ/μm². The mid-IR energy fluence on the sample may be around 50 pJ/μm², depending on the wavenumber. The camera may run at 100 Hz frame rate during data acquisition. In order to synchronize the probe pulse, the pump pulse, and the camera frame rate, one may use a pulse generator to synchronize the timing and control the pump-probe pulse delay. In addition, the duty cycle control may be applied to the mid-IR laser trigger signal so that 10 KHz mid-IR laser pulse train is turned on and off at 50 Hz.

Figure 3:
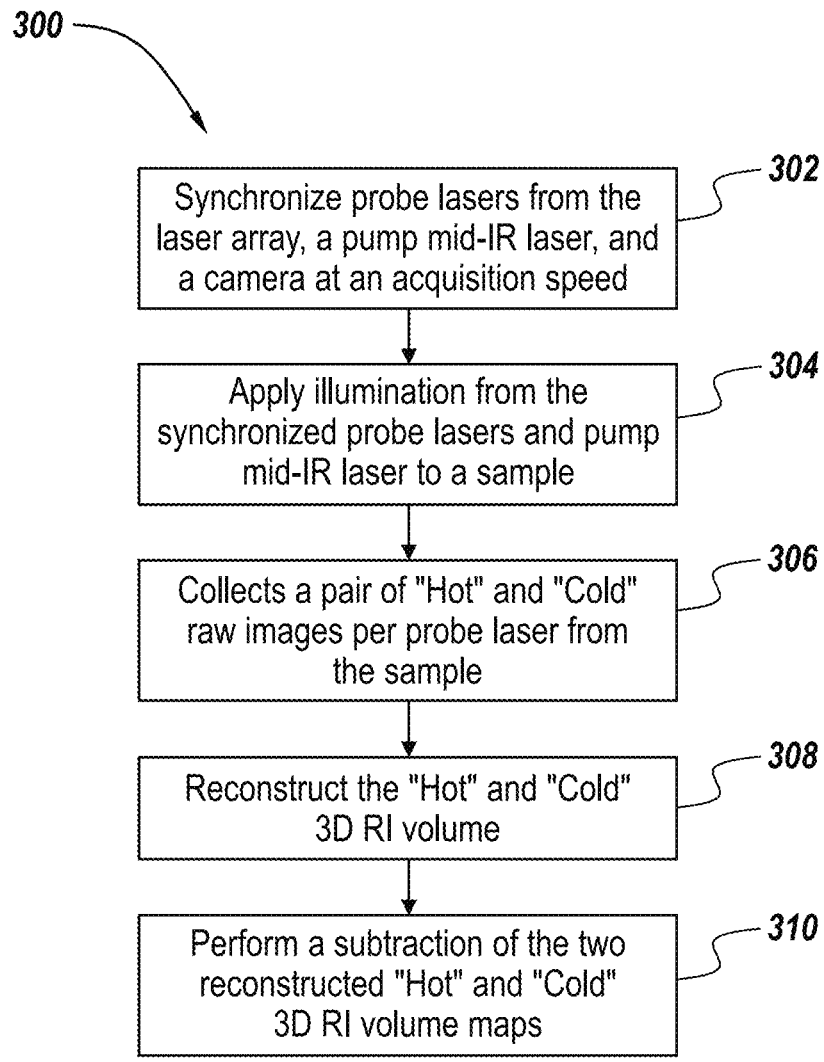
FIG. 3 is an example process flowgraph of operations included in an example process 300 for performing 3D chemical imaging.

FIG. 3 is an example process flowgraph of operations included in an example process 300 for performing 3D chemical imaging. Time synchronization is crucial to capture the transient RI fluctuations. BS-IDT imaging system 200 synchronizes (302) the probe lasers 205 of laser 204, the pump mid-IR laser 202, and the camera 214 at an acquisition speed of 100 Hz. Both probe laser 204 and pump mid-IR laser 202 may be modulated at a 10 kHz repetition rate and ~1 μs pulse duration. Each probe laser pulse may be precisely synchronized with the corresponding mid-IR laser pulse with a short time delay. This time delay (~0.5 μs) may be added to the probe laser pulse to capture the maximum RI variation from the sample. Since the CMOS camera is operated at 100 Hz, 50 Hz duty-cycle modulation is further imposed on the mid-IR laser pulse train to switch the recorded frame between "Hot" and "Cold" states.

BS-IDT imaging system 200 applies (304) illumination from the synchronized probe lasers 205 from laser array 204 and pump mid-IR laser 202 to sample 206. For widefield MIP microscopy, the application of a pulsed probe laser 205 here increases the imaging resolution, the contrast and SNR, considering the slow frame rate of camera 214. For each probe laser illumination at a fixed pump mid-IR wavenumber, BS-IDT generate (306) a pair of "Hot" and "Cold" raw images from sample 206. In one example, BS-IDT imaging system 200 repeats the above data acquisition process to generate 16 pairs of "Hot" and "Cold" raw images from sample 206. Other number of Hot" and "Cold" raw images besides 16 may be used. Following the acquisition, BS-IDT reconstructs the "Hot" and "Cold" 3D RI volume maps (308) using IDT's inverse scattering model and the "Hot" or "Cold" raw images. Process 300 includes performing (310) a simple subtraction of the two reconstructed "Hot" and "Cold" 3D RI volume maps revealing small (~$10^{-4}$ to ~$10^{-3}$) RI fluctuations due to the MIP-induced changes in the sample for a particular wavenumber. This process not only provides the 3D structure of the sample but also returns a volumetric molecular composition map throughout the object.

Following a similar workflow, BS-IDT can provide site-specific mid-IR spectra from the hyperspectral 3D chemical maps by scanning the mid-IR wavenumber, uncovering various unique biochemical compound distributions. More importantly, the spectroscopic information enables the extraction of the fingerprint absorption spectrum from arbitrary volumetric areas of interest with unknown chemical compositions. Chemometric analysis further decodes the chemical information utilizing the extracted fingerprint spectrum, which is not feasible for fluorescence microscopy.

BS-IDT utilizes the conventional intensity diffraction tomography model for recovering the 3D RI distributions of the sample. For BS-IDT, we model the object as a 3D scattering potential within a given volume $\Omega$ as $V(r, z)=k^2 (4\pi)^{-1}\Delta\epsilon(r)$, where r denotes the 3D spatial coordinates (x, y, z), k is the probe beam wavenumber, and $\Delta\epsilon(r)$ is the permittivity contrast between the object and the imaging medium. Each oblique laser illumination on the sample acts as a plane wave $u_i(r|v_i)$ incident on the sample at a given angle defined by its lateral spatial frequency vector $v_i$. Under the first Born approximation, the model assumes the total field generated from this incident field scattering from the object can be evaluated as a summation $$u_{tot}(r|v_i) = u_i(r|v_i) + \int\int\int_\Omega u_i(r'|v_i)V(r')G(r-r')d^3r', \quad (1)$$

of the incident and first-order scattered field defined by a 3D convolution with the Green's function G(r). The IDT model assumes that the total scattered field from the object results from a stacked set of 2D axial slices through the object because the scattering events from each sample point are mutually independent. This assumption implies that the object's volumetric distribution can be recovered from a single 2D plane if the additional propagation is included in the inverse model for recovering each axial slice.

To recover the 3D object, BS-IDT relates the object's volumetric scattering potential to the system's measured intensity images using the cross interference between the incident and scattered field. This cross interference linearly encodes the object's scattering potential into intensity. Coupled with oblique illumination, the cross-interference term and its conjugate are spatially separated in the Fourier plane allowing for linear inverse scattering models under weakly scattering assumptions. With this separation and the further assumption that the object's permittivity contrast is complex ($\Delta\epsilon(r, z)=\Delta\epsilon_{re}(r, z)+j\Delta\epsilon_{im}(r, z)$), a forward model relating the background-subtracted image intensity spectra to the volumetric object can be developed $$\hat{I}(x, y|v_i) = \sum_m H_{re}(v, m|v_i)\Delta\hat{\epsilon}_{re}(v, m) + H_{im}(v, m|v_i)\Delta\hat{\epsilon}_{im}(v, m), \quad (2)$$

where $\hat{\cdot}$ denotes the Fourier transform of a variable, m denotes the axial slice index, and $H_{re}$ and $H_{im}$ are the transfer functions (TFs) containing the physical model. These transfer functions have the form $$H_{re}(v, m|v_i) = \frac{jk^2\Delta z}{2}A(v_i) \quad (3a)$$

$$P(v_i)\left[P(v-v_i)\frac{e^{-j[\eta(v-v_i)-\eta(v_i)]m\Delta z}}{\eta(v-v_i)} - P(v+v_i)\frac{e^{j[\eta(v+v_i)-\eta(v_i)]m\Delta z}}{\eta(v+v_i)}\right],$$

$$H_{im}(v, m|v_i) = -\frac{k^2 \Delta z}{2} A(v_i) \quad (3b)$$

$$P(v_i) \left[ P(v-v_i) \frac{e^{-j[\eta(v-v_i)-\eta(v_i)]m\Delta z}}{\eta(v-v_i)} + P(v+v_i) \frac{e^{j[\eta(v+v_i)-\eta(v_i)]m\Delta z}}{\eta(v+v_i)} \right],$$

where $A(v_i)$ denotes an illumination source amplitude, $P(v)$ is the microscope's circular pupil function, $\Delta z$ is the discretized slice thickness, and $\eta(v) = \sqrt{\lambda-2-|v|^2}$ is the axial spatial frequency with imaging wavelength 1 and translation dependent on the illumination angle. Given this linear forward model, the inversion of this model is straightforward using a slice-wise deconvolution with Tikhonov regularization.

Figure 4A:
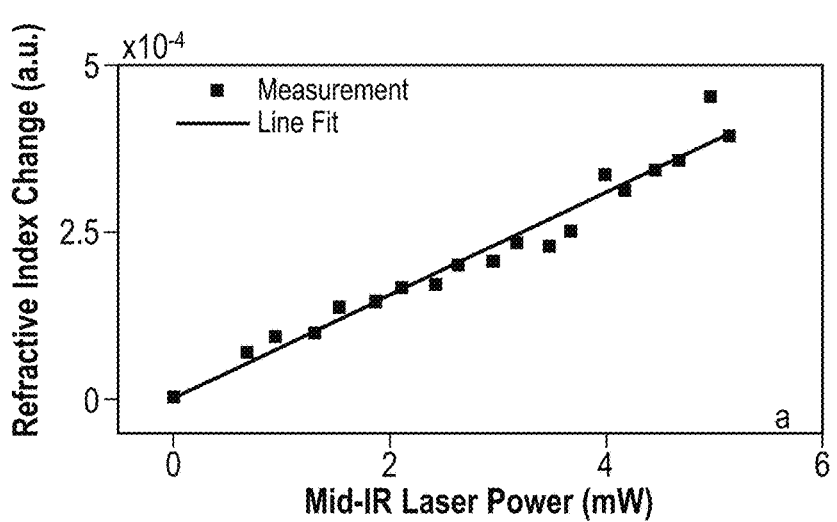
FIGS. 4A-4G are schematic diagrams of the system performance of a BS-IDT imaging system.
Figure 4B:
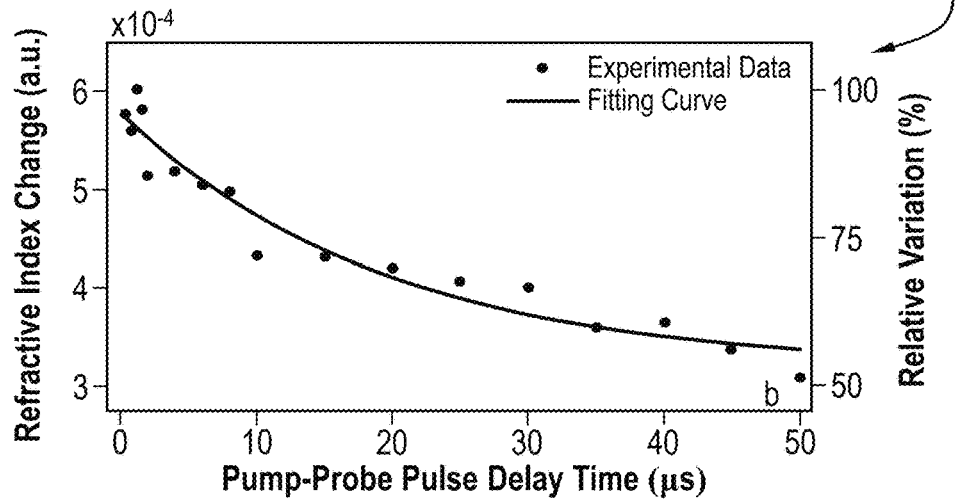
Figure 4C:
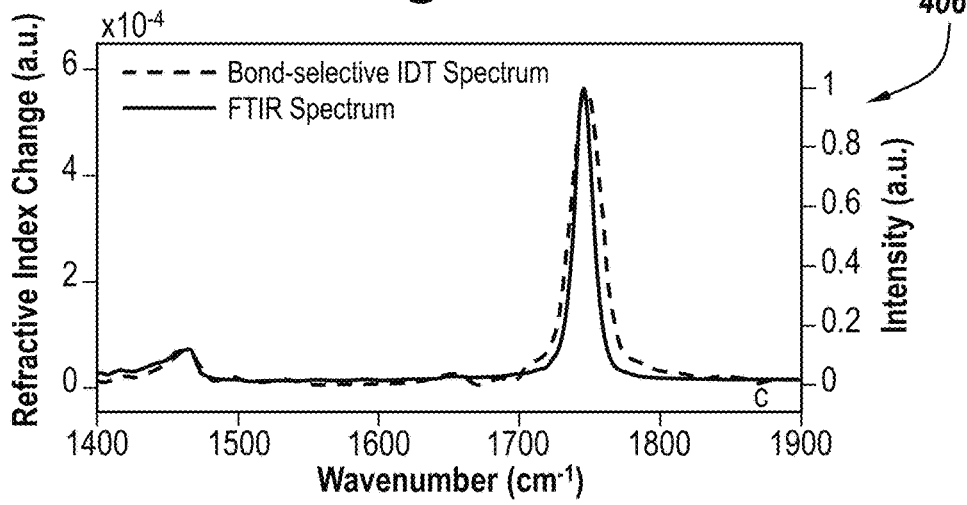

FIGS. 4A-4C are schematic diagrams of the system performance of BS-IDT imaging system 200. Using soybean oil film as a testbed, three independent tests are performed quantifying the RI variation with respect to mid-IR laser power, delay time between the pump and probe laser pulses, and the mid-IR wavenumber. Here, the delay time may be defined as the temporal shift between the probe pulse's center and the pump pulse's center. The sample is made by sandwiching an oil film uniformly distributed between two pieces of 0.2 mm-thick Raman-grade Calcium Fluoride ($CaF_2$) glass with a diameter of 10 mm. For the first two tests, the wavenumber of the mid-IR laser is fixed to 1745 $cm^{-1}$, corresponding to the C=O stretch vibration in the oil sample. The dependence of RI variation on the mid-IR pump laser power is shown in graph 402 of FIG. 4A. A clear linear relation exists between the mid-IR absorption and recorded RI changes (R square coefficient=0.96). This result indicates no system-induced nonlinear errors in the measured RI variations based on the mid-IR pump power.

Next, the RI variations are quantified with the pump-probe delay time in graph 404 of FIG. 4B. The experimental data are fitted by an exponential decay function with a temporal decay constant of ~20 µs. The thermal temporal decay constant varies with thermal diffusivity and sample spatial size. With a large area and size, the oil film sample shows a slower decay time than other smaller biological objects. An experimental measurement and numerical simulations are performed for particles with sizes comparable to organelles in cells. These particles demonstrate much faster temporal decay processes compared to the oil film. Therefore, the temporal pulse spacing of our mid-IR laser is ~100 µs, allowing sufficient cooling.

Finally, the BS-IDT's absorption spectroscopy was compared with standard Fourier-transform Infrared (FTIR) Spectroscopy to confirm that BS-IDT imaging system 200 can properly extract the oil's spectrum. Graph 406 shows the FTIR spectra intensity and the BS-IDT recovered RI variation, as shown in FIG. 4C. The close agreement in recovered spectral information verifies that BS-IDT adequately recovers the MIP-induced RI change. Together, these tests indicate that BS-IDT faithfully recovers the chemical-specific RI variations in a sample of interest.

Figure 4D:
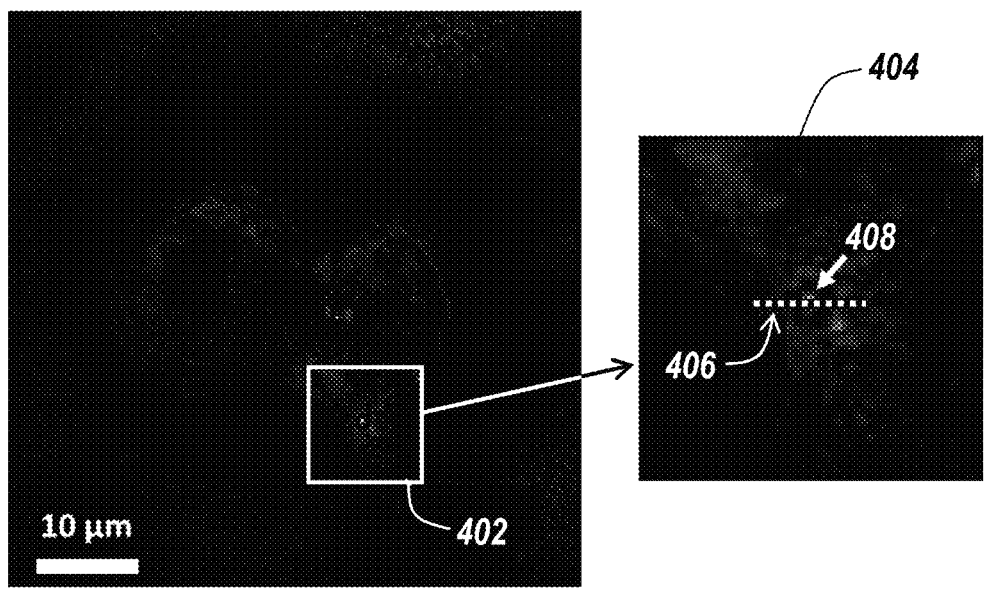
Figure 4E:
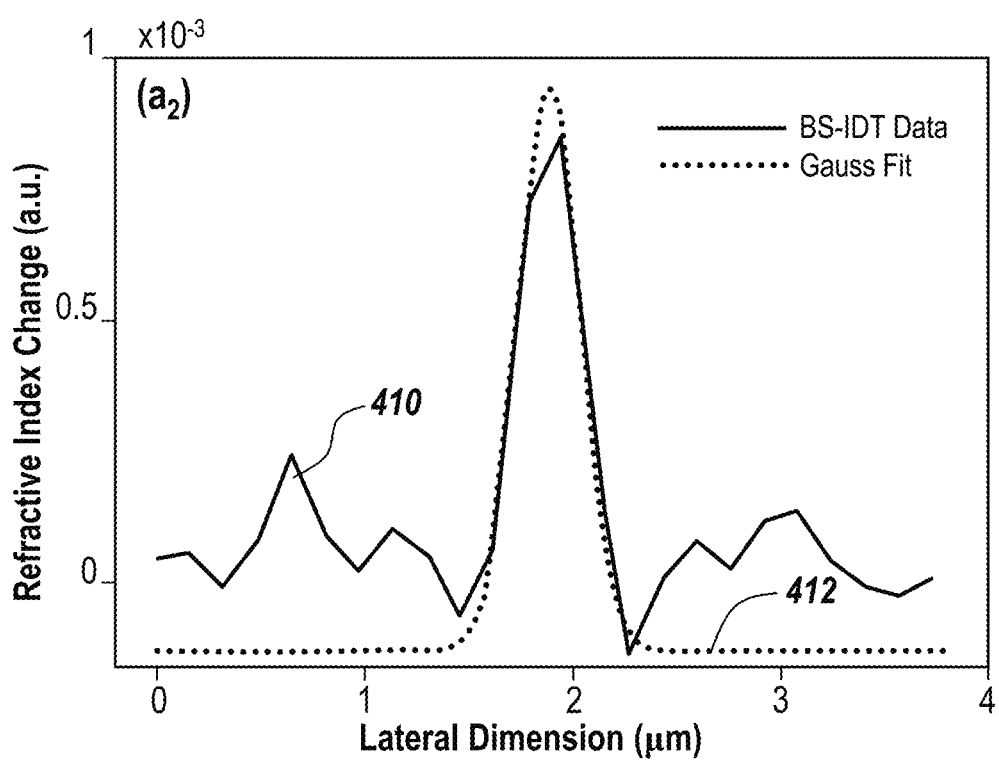

The lipid chemical imaging data used here are further improved by halo artifacts removal processing. FIG. 4D shows the image corresponding to a depth of ~-1.065 µm. A selected lipid droplet 408, included in box 402, is zoomed in inset 404. FIG. 4E shows curve 410 extracted from lateral profile along the dashed line 406 cross the selected lipid droplet 408 in FIG. 4D. Curve 412 is a Gaussian line shape fitting (FWHM: ~349 nm, R square coefficient=0.99) for the main peak corresponding to the selected lipid droplet 408.

Figure 4F:
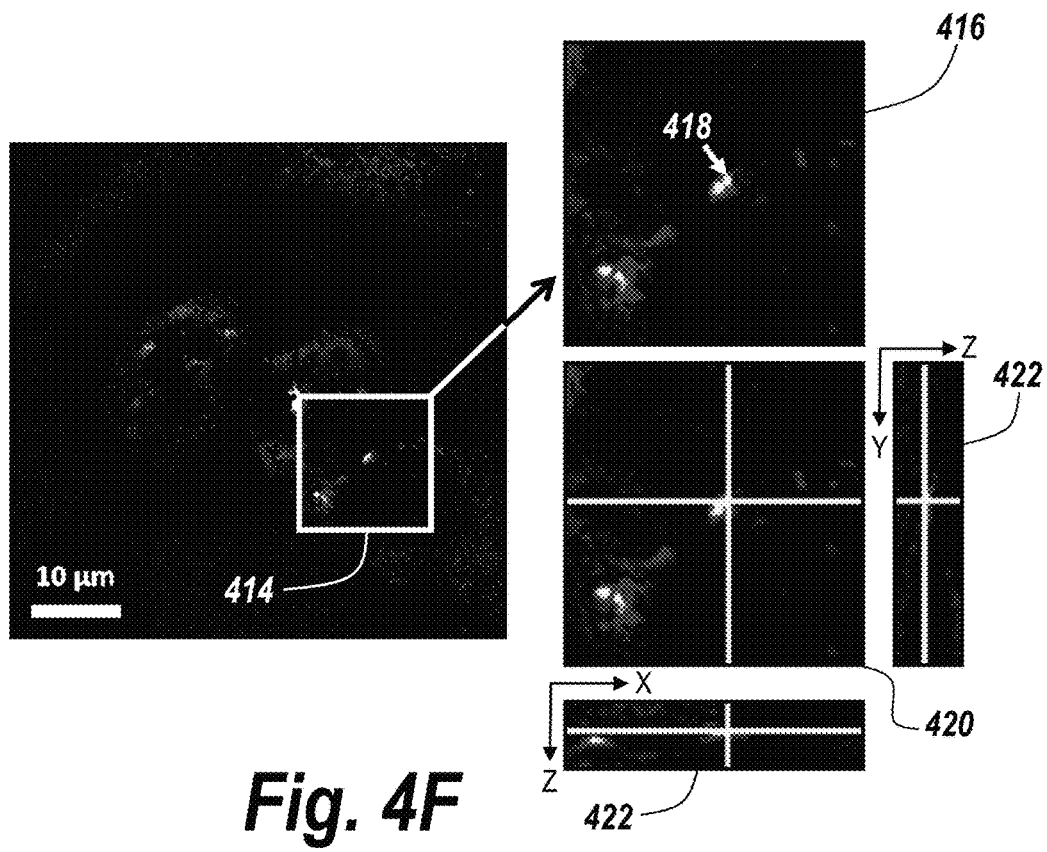
Figure 4G:
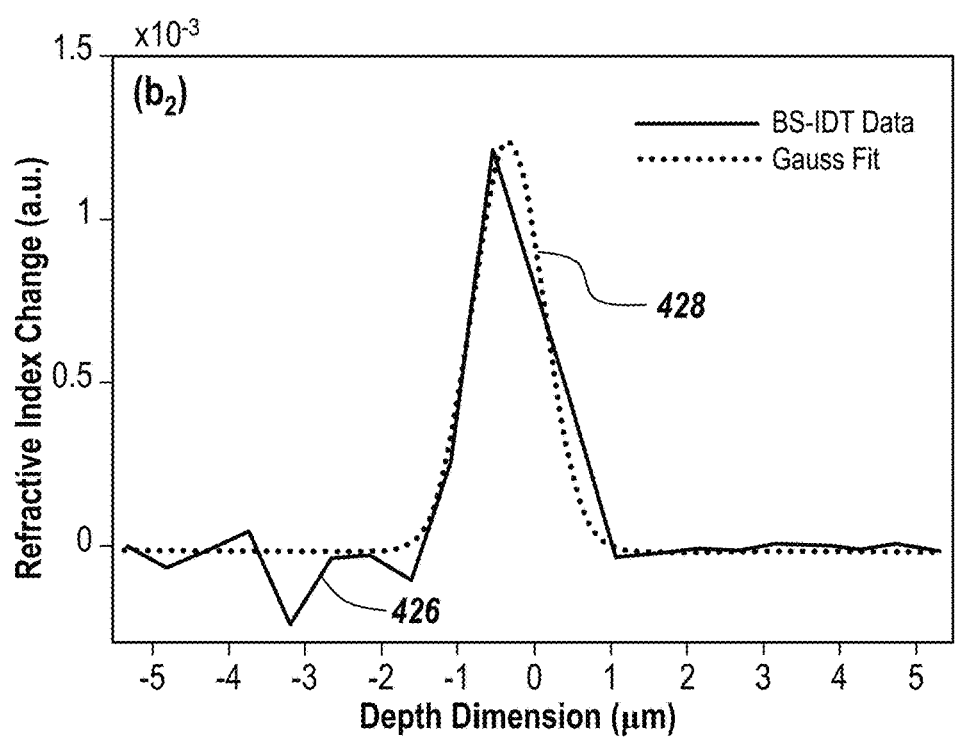

FIG. 4F shows an image corresponding to the depth of ~-0.532 µm. A selected lipid droplet 418, included in box 414, is zoomed in as shown in inset 416. The orthogonal view of the selected lipid droplet 408 is also demonstrated in insets 420, 422, and 424. "Z" indicates the depth direction. "X" and "Y" indicate lateral direction. FIG. 4G shows curve 426 being the extracted depth profile from the selected lipid droplet's peak signal in FIG. 4G. Curve 428 is a Gaussian line shape fitting (FWHM:~1.082 µm, R square coefficient=0.95) for the main peak corresponding to the selected lipid droplet 408.

The resolution of BS-IDT and demonstrated the results are characterized in FIGS. 4D-4G. The fixed bladder cancer T24 cells are used as the test bed. By performing depth-resolved chemical imaging at 1745 $cm^{-1}$ mid-IR wavenumber, the two lipid droplets 408 and 418 were picked to plot the lateral and axial line profiles. The FWHM of the lateral line profile is ~349 nm, and the FWHM of the axial line profile is ~1.082 µm. Here, an additional halo artifact removal step was applied to the chemical imaging data. This process relies on the assumption that the halo effect is predominantly encoded into slowly varying spatial frequencies in the recovered object spectrum. By applying Hilbert transforms to the gradient of the phase along different directions in the image, the slowly varying halo artifacts are removed from the image. After applying these transforms and obtaining a collection of filtered images of the object, the maximum value at each pixel across these images is obtained to produce a halo-free image.

For the BS-IDT chemical imaging data, the object's RI at each slice differs from the corresponding phase only by a constant value. The object bandwidth still contains halo artifacts in low spatial frequencies. These factors allow one to apply the Hilbert transform approach equivalently to the sample for artifact removal. A slice-wise artifact removal was performed through the 3D RI reconstruction instead of the 2D phase image condition.

FIGS. 5A-5M illustrate the 3D chemical imaging and mid-IR fingerprint spectroscopy capabilities of BS-IDT imaging system 200 on fixed human bladder cancer cell samples. Human bladder cancer cells (T24 cells) were fixed, washed, and immersed in $D_2O$ phosphate-buffered saline (PBS) between two pieces of 0.2 mm-thick Raman-grade $CaF_2$ glasses. $D_2O$ was chosen for the immersion medium as it minimizes the water IR absorption and demonstrates a relatively flat spectral response. To illustrate 3D chemical imaging, this sample was first imaged under different mid-IR laser illumination conditions (FIGS. 5A-5K) selected for protein, lipid, off-resonance imaging as well as imaging with the mid-IR laser beam blocked. Mid-IR fingerprint hyperspectral imaging was then performed on T24 cells to illustrate the spectroscopic capabilities of BS-IDT (FIG. 5L). Finally, BS-IDT's potential for cell metabolic profiling is shown by identifying cancer cells with differing invasiveness based on their intracellular lipid content (FIG. 5M).

Figure 5F:
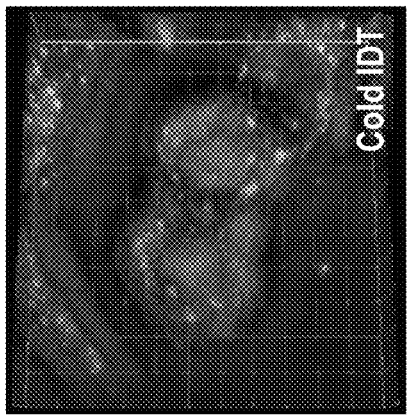
Figure 5I:
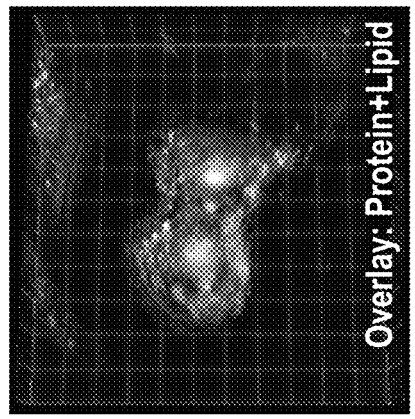
Figure 5G:
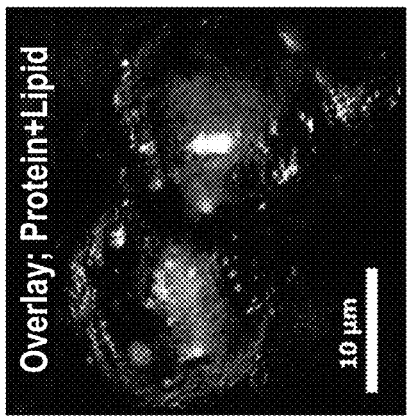
Figure 5J:
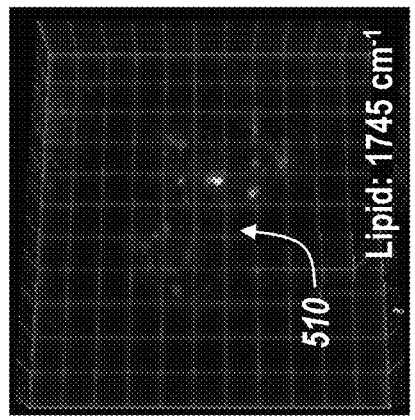
Figure 5H:
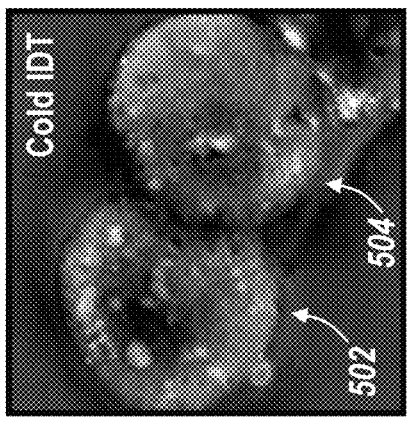
Figure 5K:
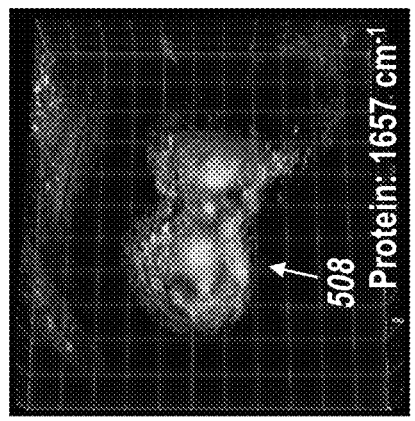
Figure 5L:
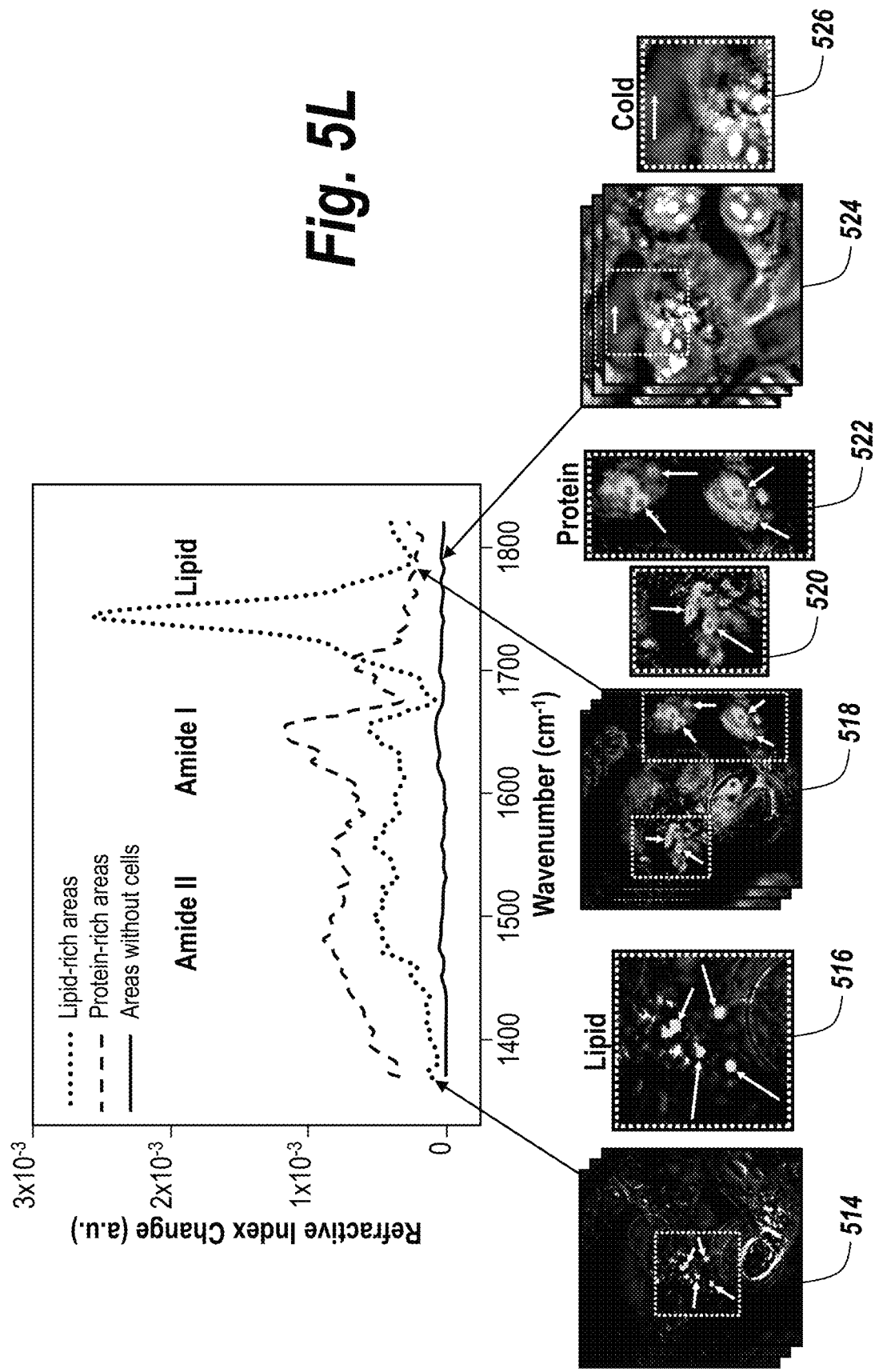
Figure 5M:
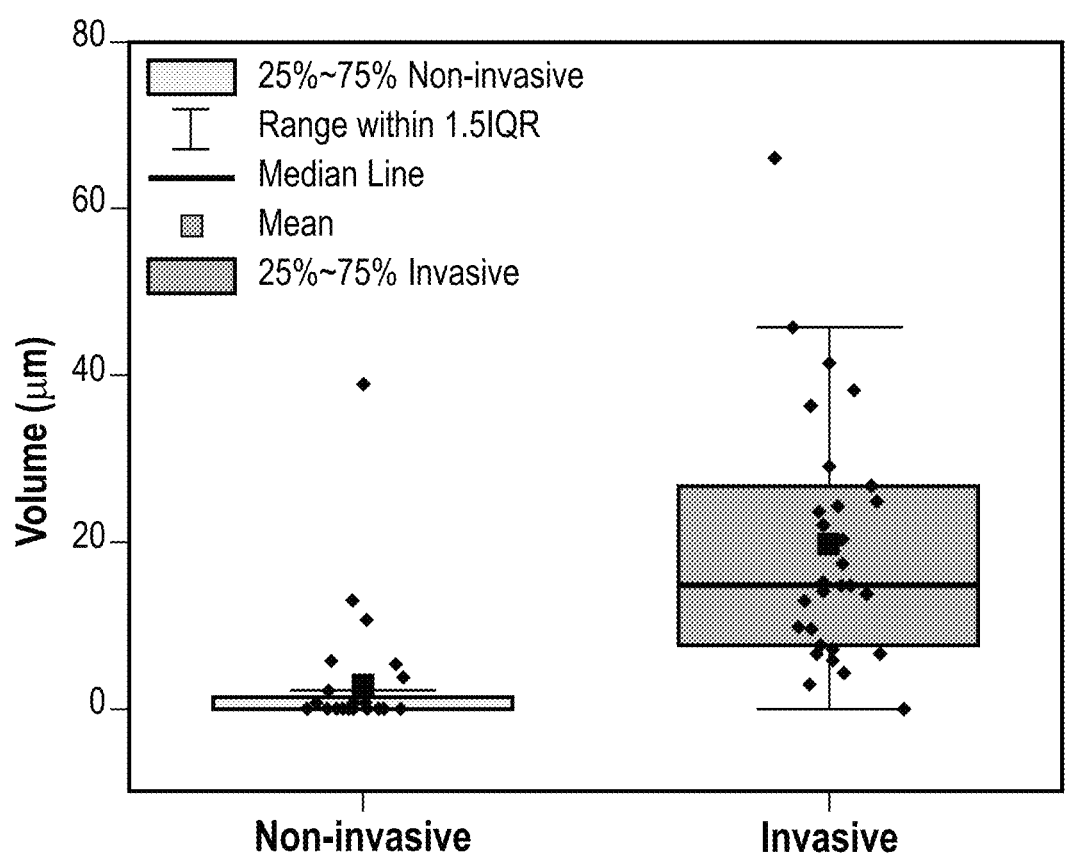

FIGS. 5A-5K illustrate the 3D chemical imaging capabilities of BS-IDT imaging system 200. In particular, FIGS. 5A-5E show individual slice-wise reconstructions of two mitotic T24 cells 502 and 504 with five different conditions: a) cold RI map of the entire cell structure, b) Amide I band protein absorption map at 1657 $cm^{-1}$, c) lipid C=O absorption map at 1745 $cm^{-1}$, d) RI variation map at 1900 $cm^{-1}$ off-resonance where minimal RI variations should appear, and e) RI variation map when the mid-IR pump beam is blocked. For each image, sixty camera frames may be averaged for each diode laser illumination to generate chemical imaging results with a speed of ~0.05 Hz acquisition rates. FIGS. 5A-5C shows all the cellular features obtained in FIG. 5A at varying axial positions (−1.065 μm, 0 μm, 1.065 μm). Only specific structures contain protein 508 (FIG. 5B) or lipids 510 (FIG. 5C). FIG. 5F is the zoomed in cold imaging results of dash-line square area 512 in FIG. 5A.

The images from two control groups (FIGS. 5D-5E) confirm that the chemical imaging contrast originates from MIP effects. The proteins 508 appear to be relatively uniformly distributed throughout the cell's cytosol, while the lipids 510 are mostly concentrated within lipid droplet organelles for energy storage. As many different cellular functions are underway during mitosis, one would expect a strong protein response throughout the cytosol. The system resolution is characterized using the lipid features extracted from the absorption map at 1745 cm$^{-1}$. The measured lateral and axial FWHM linewidths are ~349 nm and ~1.081 μm, respectively. When these chemical-specific images are overlayed (FIGS. 5G and 5K), these protein and lipid structures 508 and 510 are predominantly separate with only some overlap for specific lipid droplets. When rendered in 3D (FIGS. 5H-5K), one may clearly see the 3D distribution of these chemical-specific structures. Adding this information to 3D RI reconstructions provides additional clarity regarding the cellular structures and drastically improves the wealth of information available with label-free imaging.

FIG. 5L shows the mid-IR Fingerprint spectra extracted from protein and lipid-rich areas as well as areas without cells. The chemical images as shown by inserts 514-526 show the areas of interest highlighted by arrows. FIG. 5M shows the statistical results of lipid content volume measured from T24 cells and SW780 cells. T24 is an invasive bladder cancer cell line. SW780 is a non-invasive bladder cancer cell line. Thirty independent cells were used for each cell type. The volumes of lipids were independently measured and extracted 30 times per cell type.

To further illustrate the benefit of BS-IDT's 3D chemical imaging, the 2D and 3D reconstructions from the same dataset using the Differential Phase Contrast (DPC) model and the IDT model are compared, respectively. DPC microscopy is a 2D, non-interferometric computational imaging technique that merely requires four oblique illuminations. Despite lacking depth-resolved 3D imaging capabilities, DPC microscopy's minimal image requirement enables high-speed imaging to achieve the same incoherent diffraction-limited resolution as IDT. Bond-Selective DPC (BS-DPC) microscopy can be performed using the same hardware as IDT.

Figure 6G:
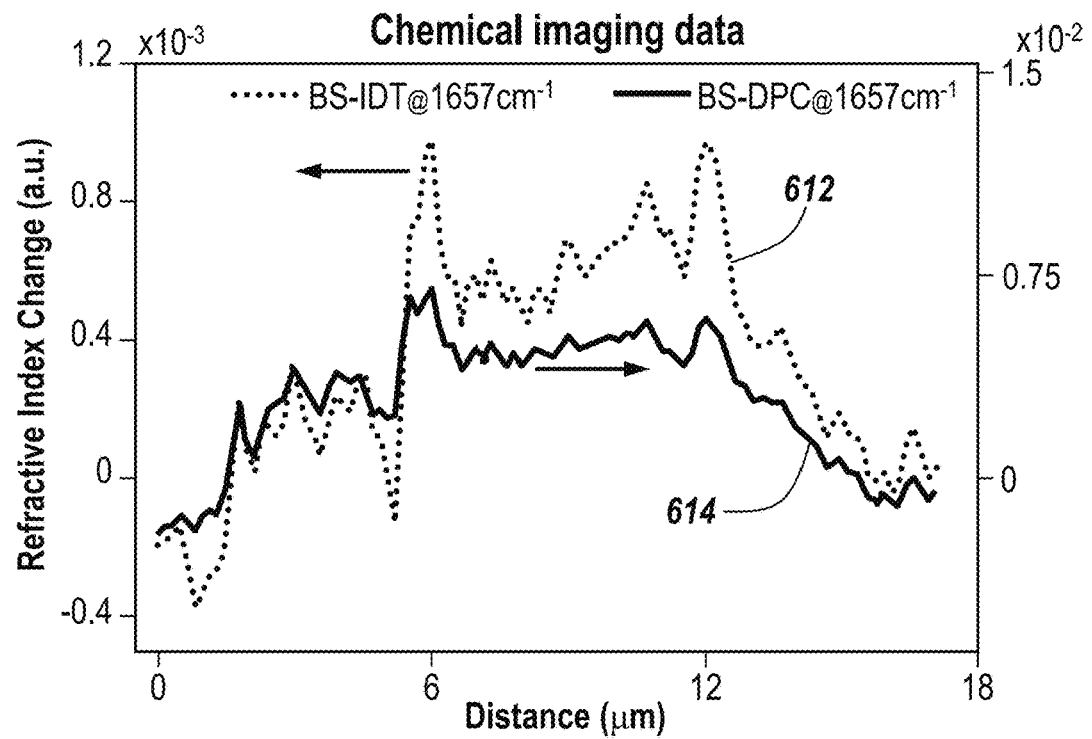

FIGS. 6A-6J illustrate the BS-IDT imaging results and the BS-DPC imaging results obtained using the same raw bladder cancer cell dataset. FIGS. 6A-6C are BS-IDT cold and chemical 3D RI reconstruction results sectioned at 0 μm depth of sample bladder cancer cells 602 and its corresponding proteins 604 and lipids 606. The sample bladder cancer cells 602 are in D$_2$O PBS. FIGS. 6D-6F are BS-DPC cold and chemical 2D phase reconstruction results of the same sample 602, protein 604, and lipids 606. For images in FIGS. 6A-6C and FIGS. 6D-6F, each row corresponds to the same mid-IR radiation.

Figure 6H:
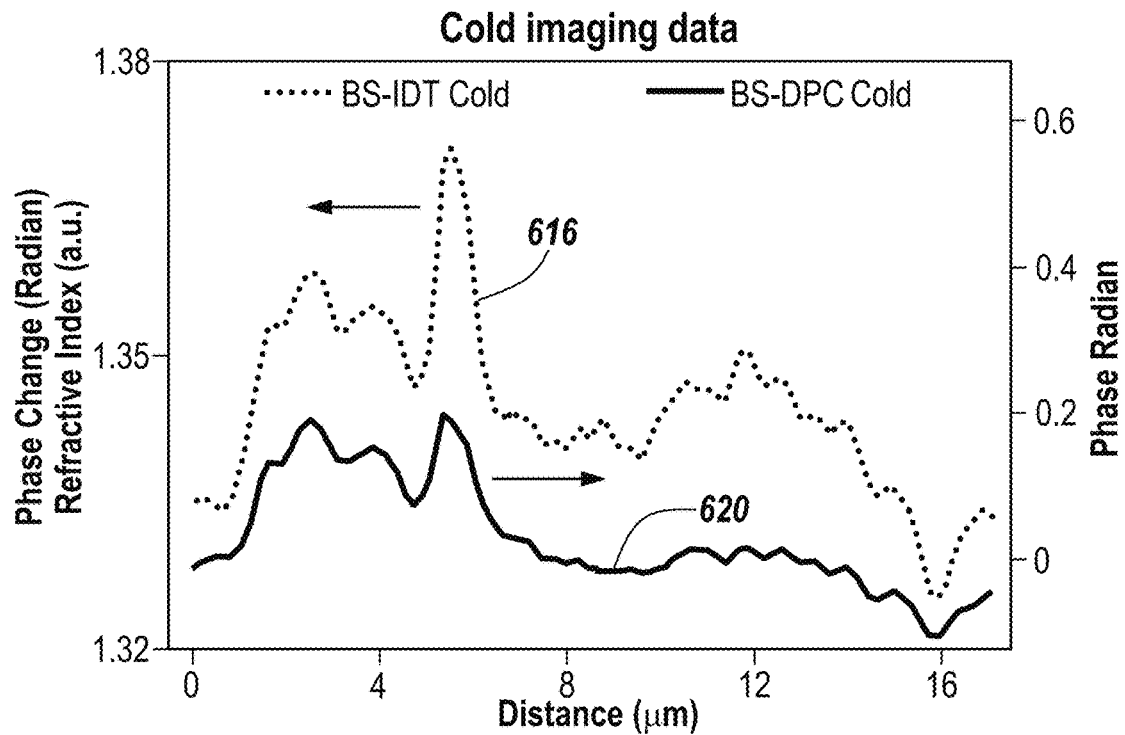
Figure 6I:
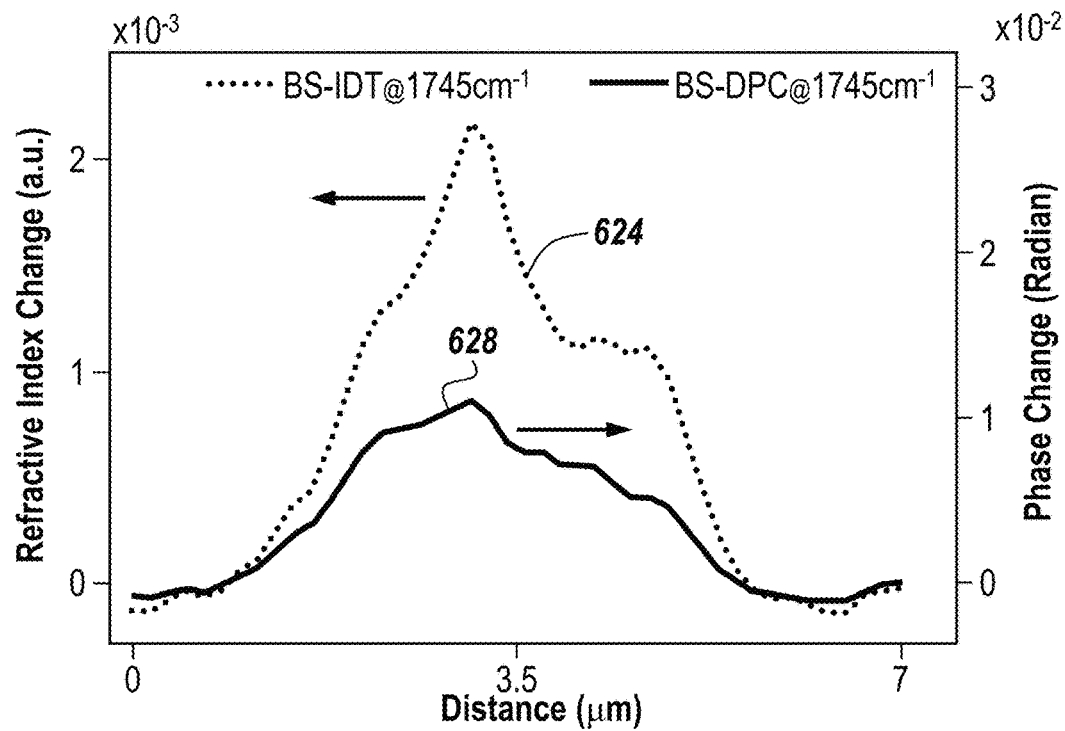
Figure 6J:
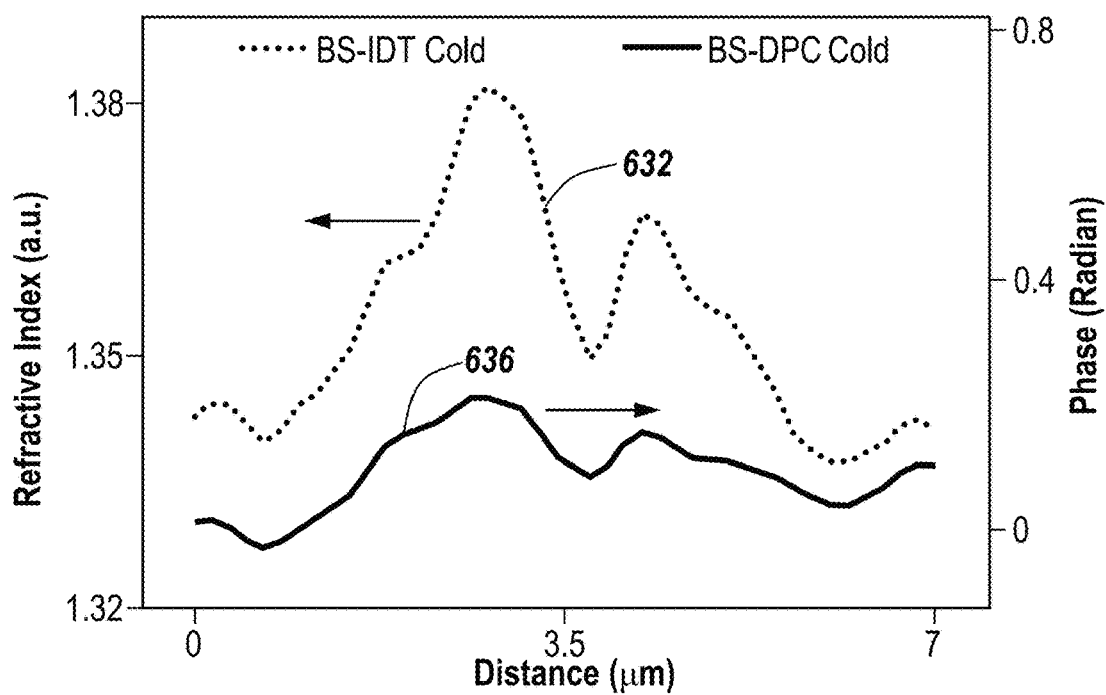

FIG. 6G shows profile line 612 extracted from dash line area 608 of FIG. 6B. Profile line 614 is extracted from dash line area 610 of FIG. 6E. FIG. 6H shows profile line 616 extracted from dash line area 618 of FIG. 6A. Profile line 620 is extracted from dash line area 622 of FIG. 6D. FIG. 6I shows profile line 624 extracted from dash line area 626 of FIG. 6C. Profile line 628 is extracted from dash line area 630 of FIG. 6F. FIG. 6J shows profile line 632 is extracted from dash line area 634 of FIG. 6A. Profile line 636 is extracted from dash line area 638 of FIG. 6D.

The cold (FIGS. 6A, 6D), the protein-band (FIGS. 6B, 6E), and the lipid-band (FIGS. 6C, 6F) imaging results, as well as the extracted line profiles (FIGS. 6G-6J). The BS-IDT recovers the RI map, while BS-DPC recovers the phase map. BS-DPC imaging allows high-quality bond-selective chemical imaging results but demonstrates lower contrast and degraded resolution compared to BS-IDT's imaging results. Despite that both methods use the same raw dataset, different algorithms affect the reconstructed SNRs. This degradation mainly originates from BS-DPC method's integration of the cell's features across various depths. In contrast, BS-IDT's 3D imaging capability much enhances the fine features and improves imaging contrast. In addition, BS-IDT is able to obtain temperature variations since it can de-couple RI from the optical path. For BS-DPC, directly extracting temperature change is still challenging in that the DPC method inherently recovers the integrated phase through the object volume.

Observing the 3D molecular composition of multicellular organisms, like the *C. elegans* worm, can serve as an important model system to decipher many fundamental biology questions, including lipid metabolism and its connection to aging and disease. However, evaluating such specimens requires a complex process with conventional methods using exogenous contrast agents or dye stains. These approaches can often be detrimental to the sample and make it difficult to properly locate molecules of interest within the volumetric object. Complex labeling protocols can also easily damage the sample and hinder biological research. Thus, visualizing the volumetric distributions of chemical bonds within such samples is highly desirable with a label-free method.

Figure 7K:
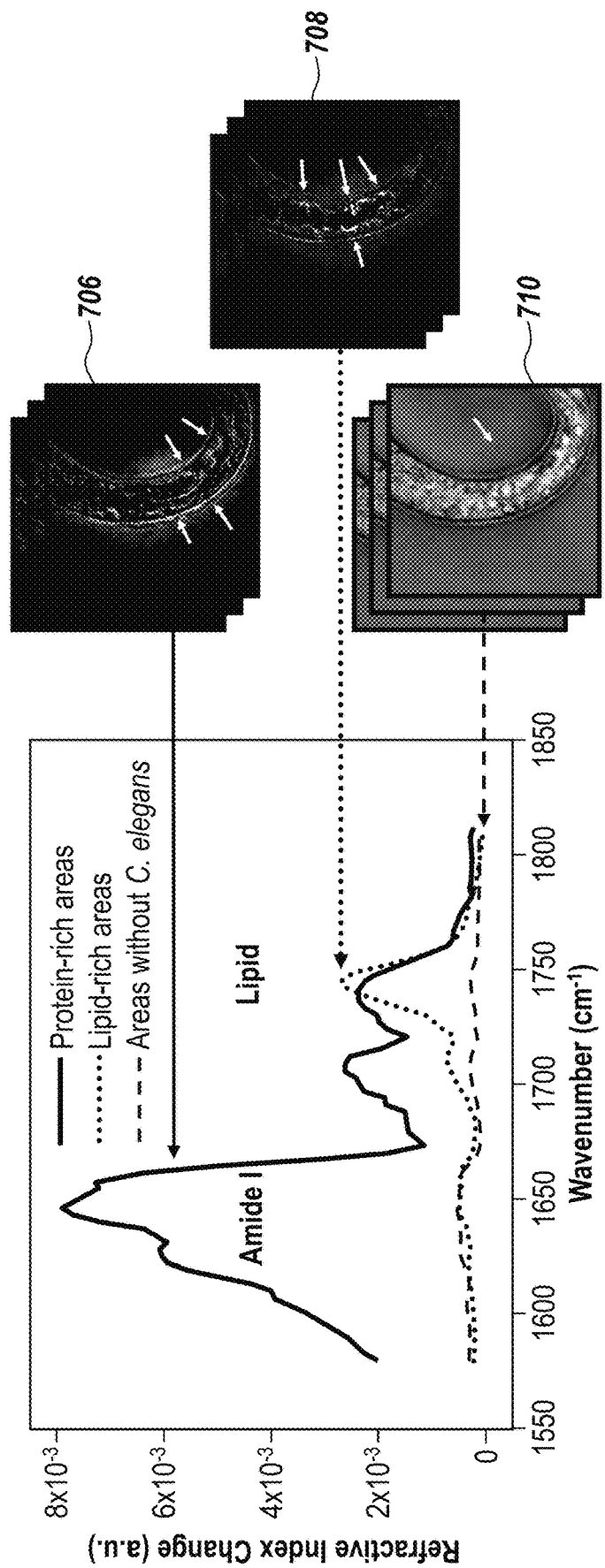

FIGS. 7A-7K illustrate multicellular organism 3D chemical imaging with an example BS-IDT imaging system on a *C. elegans* worm 702. From FIGS. 7A-7F, images in each column are from the same depth. Images in each row are under the same mid-IR laser illumination conditions. The scale bar in FIG. 7A is applicable to FIGS. 7A-7C. The scale bar in FIG. 7D is applicable to FIGS. 7D-7F. FIGS. 7A-7F are depth-resolved cold imaging results. FIGS. 7B and 7E are depth-resolved protein imaging results at 1657 cm$^{-1}$ wavenumber. FIGS. 7C and 7F are depth-resolved lipid imaging results at 1745 cm$^{-1}$ wavenumber. FIGS. 7D-7F are cold, protein, and lipid imaging results of dash-line square area 704 in FIG. 7A. FIGS. 7G-7I are 3D rendering of the *C. elegans* shown in FIG. 7A, FIG. 7B, and FIG. 7C. FIG. 7J is the 3D overlay of FIG. 7H and FIG. 7I. FIG. 7K is the mid-IR fingerprint spectra extracted from protein and lipid-rich areas as well as areas without worms. The chemical images on inserts 706, 708, and 710 show the areas of interest that are used to extract the spectra as shown by the arrows.

For imaging this specimen, the IDT probe illumination captured the entire worm in a single measurement (FIGS. 7A and 7D), but the focused IR beam only illuminated a subset of the worm at each position. To resolve this FOV mismatch, multiple IDT acquisitions were obtained while scanning the IR beam through all segments of the worm 702. For the ~100 μm×100 μm BS-IDT FOV, ten measurement sets were acquired while scanning the IR beam through the worm and computationally stitched them together in post-processing.

Each scan took ~19.2 seconds per measurement. The above imaging process was repeated for different mid-IR wavenumbers to recover protein (Amide I band, 1657 cm$^{-1}$) and lipid (C=O band, 1745 cm$^{-1}$) 3D morphologies throughout the sample (FIGS. 7B,7C). With BS-IDT's 3D reconstruction capabilities, one can observe all object slices in a 3D rendering highlighting the chemical distribution throughout the sample (FIGS. 7G-7J). Finally, the mid-IR spectroscopy capabilities on this type of multicellular sample was further validated through a spectroscopic scan on a portion of the C. elegans worm (FIG. 7K).

The C. elegans imaging results highlight the significant potential for this modality in evaluating complex multicellular specimens. From the slice-wise reconstructions and rendering in FIG. 7, one can observe spatial dependency in the lipid and protein distribution within the C. elegans. Amide I protein band resonance appears strongest in the worm's anterior half, while significant lipid storage exists along the digestive tract towards the worm's posterior in concentrated circular structures in 3D space. This distribution agrees with expectations, as the worm stores lipids within fat granules towards its posterior when it is well-fed.

In the zoom-in tail region (FIGS. 7D-7F), one can observe that the chemically sensitive BS-IDT can separate the lipid granules and proteins that exhibit similar spherical geometries. This added detection provides significant benefits for biologists wanting label-free analysis of the C. elegans structures. Through the spectroscopic analysis in FIG. 7K, one can confirm these signatures are truly proteins and lipids, and there exist unique mixtures in varying structures within the sample. Evaluating the composition and ratios of lipids to proteins in these structures could provide new insights into C. elegans development with broader impacts on other biological research fields. These results show the exciting potential for BS-IDT in imaging larger complex biological specimens with molecular specificity.

BS-IDT realizes high-speed (~0.05 Hz, up to ~6 Hz) and high-resolution (~350 nm laterally, ~1.1 µm axially) 3D chemical-specific, quantitative computational imaging over a large FOV (~100 µm×100 µm) and mid-IR fingerprint spectroscopy on cells and multicellular C. elegans with a simple system design. BS-IDT has improved the chemical volumetric imaging speed by ~40 times, the depth resolution, and the FOV by ~3 times, as compared to the state-of-the-art interferometric ODT-based MIP method.

BS-IDT's superior performance can be attributed to several innovations in its instrumentation and advances in computational imaging. First, BS-IDT provides high-resolution 3D chemical images by a unique pump-probe pulsed IDT design. IDT utilizes oblique illuminations encoding high spatial frequency information about the sample into the microscope's passband up to the incoherent resolution limit. By further using the 450 nm short-wavelength probe beam to capture the MIP-induced RI variations, BS-IDT achieves high-resolution chemical imaging while bypassing the low-resolution restrictions of conventional IR methods like FTIR micro-spectroscopy.

When evaluating the juvenile C. elegans, a total of ten BS-IDT measurement sets were acquired for each wavenumber to scan the IR beam throughout the worm's entirety. During the reconstruction, these images required stitching to form a continuous chemical response throughout the worm. Conventional stitching methods such as alpha blending are not viable for this process, as the Gaussian profile of the IR beam generates a corresponding Gaussian chemical signal response within each worm section. To ameliorate this issue, we performed a Gaussian blending process to stitch the chemical signatures together.

In the blending process, a separate intensity image set was first acquired from each IR position using a red laser (~633 nm) illumination that propagates along the same beam path as the pump laser. This illumination acts as a guide star providing the central position of the mid-IR illumination. Using this guide, a centroid position was estimated from the guide star to approximate the centroid for the IR laser illumination. Using the IR laser's FWHM determined from soybean oil measurements, a series of 2D Gaussian filter masks with unity peak values were created centered at the guide star positions with variances based on the measured FWHM. Once the chemical signature volumes were reconstructed with BS-IDT, these filters were applied to each IR beam reconstruction to select only the signatures. Each filtered volume was summed together and normalized by the sum of the Gaussian filters to reduce RI errors from filtering. The final stitched volume was shown in FIG. 7 to generate visualizations of the full C. elegans chemical signatures. For plotting the spectroscopic information, the individual IR beam illumination reconstructions were still used to prevent stitching errors from altering the quantitatively recovered fingerprint spectra.

Benefiting from the widefield imaging scheme with a fast-diverging illumination design, the probe beam intensity incident on the sample is $\sim 2\times10^{-6}$ mW/µm$^2$, eight orders of magnitude lower than Raman or coherent Raman microscope. Furthermore, the use of the IDT modality allows for the chemical phase signal to be decoupled into height and RI from its 3D inverse scattering model, which cannot be achieved with the previous MIP 2D holographic microscopy methods. The end result of BS-IDT provides richer information regarding RI variations and the structural distribution of the sample's chemical composition.

Second, BS-IDT's high-speed chemical 3D imaging originates from its effective system design and efficient computational algorithms. The programmable, electrically scanned laser array provides fast illumination scanning without mechanical motion. This scan-free configuration, together with the non-interferometric imaging system design, minimizes the amount of image averaging required for noise suppression. IDT's algorithm further boosts the imaging speed due to its highly efficient linear inverse scattering model.

Third, BS-IDT's simple modular design provides a universal and scalable chemical imaging platform. BS-IDT requires no specialized optics and can be adapted to a regular brightfield microscope as an add-on module. The decoupled reflective pump beamline can also be scalable to applications using pump lasers beyond the mid-IR spectrum region so as to add greater chemical detection capabilities. This beamline design natively enables a ~60 µm FOV, sufficient for single-cell studies and spectroscopic cell profiling, as shown in our studies on bladder cancer cells. In addition, the FOV can be easily expanded by performing independent IR beam scanning to achieve multicellular organism scale FOV chemical imaging, as demonstrated in the C. elegans imaging with a FOV reaching ~100 µm×100 µm.

The performance of BS-IDT can be further enhanced with the following future advances. On the laser source side, the low mid-IR pulse energy of QCL is the bottleneck of the MIP chemical signal. Tens of nanosecond and high-energy solid-state lasers, such as pulsed mid-IR optical parametric oscillators, would provide two-fold benefits for BS-IDT imaging: 1) Significant enhancement of the chemical signal to noise ratio and 2) Larger FOV using a weakly focused mid-IR beam. On the computational imaging aspect of the system, IDT's physical model cannot be reliably applied to multiple-scattering samples without incurring greater error. It is highly desired to introduce multiple scattering IDT models into the current framework to extend the scope of BS-IDT to image strongly scattering biological samples, such as thick tissues, which may open up many other exciting biomedical applications. In addition, the BS-IDT could potentially deploy the visible probe illumination under CW mode to simplify the timing scheme further. To this end, an ultrafast camera with a frame rate matching the repetition rate of the pump laser pulse is required.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is intended that the scope of the present disclosure be limited not by this detailed description, but rather by the claims of this application. As will be understood by those familiar with the art, the present disclosure may be embodied in other specific forms without departing from the spirit or essential characteristics thereof. Accordingly, the present disclosure is intended to be illustrative, but not limiting, of the scope of the present disclosure, which is set forth in the following claims.

What is claimed is:

1. An imaging system comprising:
   an illumination source for providing oblique illuminations to a sample, the illumination source including a plurality of laser elements and a pump laser that are synchronized to produce the oblique illuminations, wherein the plurality of laser elements is arranged to form a ring of laser elements such that each laser element on the ring of laser elements is positioned to produce an oblique illumination on the sample; and
   a camera for collecting scattered illuminations from the sample, the camera producing intensity images encoding a volume of the sample for each of the oblique illuminations, wherein the camera captures three-dimensional chemical-specific refractive index (RI) variations of the sample due to the oblique illuminations using the intensity images.

2. The imaging system of claim 1, further comprising:
   an objective lens that is disposed between the sample and the camera, wherein an angle of an oblique illumination produced by each of the plurality of laser elements corresponds to a numerical aperture of the objective lens.

3. The imaging system of claim 1, wherein the pump laser is a mid-IR pump laser.

4. The method of claim 1, wherein the illumination source triggers mid-infrared photothermal (MIP) effects in the sample.

5. The imaging system of claim 1, wherein the first illumination comprises a mid-IR fingerprint region between 5 μm and ~20 μm.

6. The imaging system of claim 1, wherein each of the laser elements is a Continuous Wave (CW) diode laser.

7. The imaging system of claim 1, wherein each of the laser elements comprises a central wavelength between 400 nm and 700 nm.

8. The imaging system of claim 1, wherein each of the laser elements is modulated at a tunable repetition rate between 0 kHz and 10 kHz.

9. The imaging system of claim 1, wherein each of the laser elements comprises a pulse duration between 0.6 μs and 1 μs.

10. The imaging system of claim 1, wherein the pump laser illuminates the sample under an on-axis configuration.

11. The imaging system of claim 1, wherein each of the laser elements is operated at a same repetition rate and pulse duration as the pump laser.

12. The imaging system of claim 1, wherein the camera is a CMOS camera or CCD camera.

13. A method for microscopic imaging comprising:
   providing, using an illumination source, oblique illuminations to a sample, the illumination source including a plurality of laser elements and a pump laser that are synchronized to produce the oblique illuminations, wherein the plurality of laser elements is arranged to form a ring of laser elements such that each laser element on the ring of laser elements is positioned to produce an oblique illumination on the sample; and
   using a camera, collecting scattered illuminations from the sample and producing intensity images encoding a volume of the sample for each of the oblique illuminations, wherein the camera captures three-dimensional chemical-specific refractive index (RI) variations of the sample due to the oblique illuminations using the intensity images.

14. The method of claim 13, wherein the pump laser comprises a mid-IR pump laser.

15. The method of claim 13, wherein each of the laser elements is a Continuous Wave (CW) diode laser.

16. The method of claim 13, wherein each of the laser elements comprises a central wavelength between 400 nm and 700 nm.

17. The method of claim 13, wherein each of the laser elements is modulated at a tunable repetition rate between 0 kHz and 10 kHz.

18. The method of claim 13, wherein each of the laser elements comprises a pulse duration between 0.6 μs and 1 μs.

19. The method of claim 13, further comprising illuminating, using the pump laser, the sample under an on-axis configuration.

20. The method of claim 13, wherein each of the laser elements is operated at a same repetition rate and pulse duration as the pump laser.

21. The method of claim 13, wherein the camera is a CMOS camera or CCD camera.

22. The method of claim 13, wherein an off-axis gold parabolic mirror focuses an oblique illumination produced by the pump laser to enhance an intensity at an area of interest on the sample.

* * * * *